United States Patent [19]
Lomet et al.

[11] Patent Number: 5,485,607
[45] Date of Patent: Jan. 16, 1996

[54] CONCURRENCY-CONTROL METHOD AND APPARATUS IN A DATABASE MANAGEMENT SYSTEM UTILIZING KEY-VALUED LOCKING

[75] Inventors: David B. Lomet, Westford, Mass.; Russell J. Green, Edinburgh, Scotland

[73] Assignee: Digital Equipment Corporation, Maynard, Mass.

[21] Appl. No.: 14,188

[22] Filed: Feb. 5, 1993

[51] Int. Cl.$^6$ ............................................. G06F 17/30
[52] U.S. Cl. .................. 395/600; 395/726; 364/DIG. 1; 364/282.1; 364/246.6; 364/246.8
[58] Field of Search .................. 395/600, 425, 395/650, 725; 364/419.19

[56] References Cited

U.S. PATENT DOCUMENTS

| | | | |
|---|---|---|---|
| 4,698,752 | 10/1987 | Goldstein et al. | 395/600 |
| 4,716,528 | 12/1987 | Crus et al. | 395/650 |
| 4,965,719 | 10/1990 | Shoens et al. | 395/650 |
| 5,101,488 | 3/1992 | Rosenthal et al. | 395/425 |
| 5,151,988 | 9/1992 | Yamagishi | 395/600 |
| 5,202,971 | 4/1993 | Henson et al. | 395/425 |
| 5,212,788 | 5/1993 | Lomet et al. | 395/600 |
| 5,276,872 | 1/1994 | Lomet et al. | 395/600 |
| 5,280,611 | 1/1994 | Mohan et al. | 395/600 |
| 5,285,528 | 2/1994 | Hart | 395/725 |
| 5,287,501 | 2/1994 | Lomet | 395/600 |
| 5,327,556 | 7/1994 | Mohan et al. | 395/600 |
| 5,333,303 | 7/1994 | Mohan | 395/575 |
| 5,335,343 | 8/1994 | Lampson et al. | 395/575 |
| 5,355,477 | 10/1994 | Strickland et al. | 395/600 |

OTHER PUBLICATIONS

Wiederhoeld, Gio, "Database Design," 2d Edition, 1983, McGraw–Hill, Inc., pp. 613–628.

Gray, J. N., Lorie, R. A. Putzulo, G. R., and Traiger, I. L., "Granularity of Locks and Degrees of Consistency in a Shared Data Base,"*IFIP Working Conference on Modeling of Data Base Management Systems*, 1976, pp. 94–121.

Gray, J. and Reuter, A., *Transaction Processing: Concepts and Techniques*, pp. 406–414, Morgan Kaufmann, San Mateo, Calif., 1992.

Mohan, C., "ARIES/KVL: A Key– Value Locking Method for Concurrency Control of Multiaction Transactions Operating on B–Tree Indexes," *Proc. Very Large Databases Conference*, Brisbane, Australia, Aug. 1990 pp. 1–14.

Mohan, C. and Levine, F., "Aries/IM: An Efficient and High Concurrency Index Management Method Using Write–Ahead Logging," *IBM Research Report RJ 6846*, Aug. 1989, pp. 1–20, Almaden Research Center, San Jose, Calif.

*Primary Examiner*—Paul V. Kulik
*Attorney, Agent, or Firm*—Kenneth F. Kozik

[57] ABSTRACT

The concurrency-control mechanisms in a database-management system achieves high concurrency by using a lock-mode set larger than that conventionally employed for multi-granularity locking. In a system of key-valued locking in which locks on key-value ranges are acquired separately from the locks on the key values with which they are associated, the IX lock mode conventionally acquired on a range by update, insert, and delete operations is replaced with three separate lock modes respectively associated with those operations and invoked by them for range locking. In key-valued-locking systems in which ranges are locked commonly with the key-values associated with them, the mode set is further expanded so that each mode represents a different combination of range and key-value locks.

30 Claims, 6 Drawing Sheets

| | IS | IU | IIn | ID | S | SIX | X |
|---|---|---|---|---|---|---|---|
| IS | X | X | X | X | X | X | |
| IU | X | X | X | X | | | |
| IIn | X | X | X | | | | |
| ID | X | X | | | | | |
| S | X | | | | X | | |
| SIX | X | | | | | | |
| X | | | | | | | |

| OPERATION | RANGE LOCK | KEY LOCK |
|---|---|---|
| READ SINGLE | NONE IMPLICIT IS | S |
| UPDATE SINGLE | IX | X |
| READ SCAN | S | NON REQUIRED |
| UPDATE SCAN | SIX | NONE FOR READ X FOR UPDATE |
| INSERT | IX | X |
| DELETE | IX | X |

*Fig. 3* PRIOR ART

| TRANSACTION | INC= 39,547 | INC= 41,290 | INC RANGE 30K-50K | INC RANGE 50K-70K | COMMIT |
|---|---|---|---|---|---|
| T1 |  |  | S | S | √ |
| T2 |  |  | S |  | √ |
| T3 | S |  | IS |  |  |
| T4 |  | X | IX |  |  |

*FIG. 4* PRIOR ART

| LOCK MODE | IS | IX | S | SIX | X |
|---|---|---|---|---|---|
| IS | X | X | X | X |  |
| IX | X | X |  |  |  |
| S | X |  | X |  |  |
| SIX | X |  |  |  |  |
| X |  |  |  |  |  |

*Fig. 5* PRIOR ART

| OPERATION | CURRENT KEY | NEXT KEY |
|---|---|---|
| READ SINGLE | S | |
| UPDATE SINGLE | X | |
| READ SCAN | S | |
| UPDATE SCAN | X | |
| INSERT | IX:<br>X IF NEXT KEY<br>IS LOCKED<br>WITH S, SIX, X | IX (INSTANT) |
| DELETE | X (INSTANT) | X |

Fig. 6 PRIOR ART

| | IS | IU | IIn | ID | S | SIX | X |
|---|---|---|---|---|---|---|---|
| IS | X | X | X | X | X | X | |
| IU | X | X | X | X | | | |
| IIn | X | X | X | | | | |
| ID | X | X | | | | | |
| S | X | | | | X | | |
| SIX | X | | | | | | |
| X | | | | | | | |

Fig. 7

| OPERATION | RANGE LOCK | KEY LOCK | NEXT RANGE LOCK |
|---|---|---|---|
| READ SINGLE | NONE (IMPLICIT IS) | S | |
| UPDATE SINGLE | IU | X | |
| READ SCAN | S | NONE REQUIRED | |
| UPDATE SCAN | SIX | X (ON UPDATE) | |
| | IIn ID IF NEXT RANGE ID; SIX IF NEXT RANGE S OR SIX | X | IIn (INSTANT) |
| DELETE | ID (INSTANT) | X | ID |

*Fig. 8*

| MODES | IS-S | IIn- | ID- | IU-X | IIn-X | S- | ID-S | ID-X |
|---|---|---|---|---|---|---|---|---|
| IS-S | X | X | X | | | X | X | |
| IIn- | X | X | | X | X | | | |
| ID- | X | | | X | | | | |
| IU-X | | X | X | | | | | |
| IIn-X | | X | | | | | | |
| S- | X | | | | | X | | |
| ID-S / SIX- | X | | | | | | | |
| ID-X / SIX-X | | | | | | | | |

*Fig. 9*

| OPERATION | LOCKED ITEMS | | | | | |
|---|---|---|---|---|---|---|
| | READ RECORD | UPDATED RECORD | READ RANGE | UPDATED RANGE | INSERT RANGE | DELETE RANGE |
| READ RECORD | Y | N | Y | N | N | Y[1] |
| UPDATE RECORD | N | N | N | N | N | Y[1,2] |
| READ SCAN | Y | N | Y | N | N | N |
| UPDATE SCAN NO UPDATE | Y | N | Y | N | N | N |
| UPDATE SCAN WITH UPDATE | N | N | N | N | N | N |
| INSERT | Y[ifo][1] | Y[ifo][1] | N | N | Y | N |
| DELETE | Y[ifo][1] | Y[ifo][1] | N | N | N | N |

*Fig. 11*

| OPERATION | CURRENT KEY | NEXT KEY |
|---|---|---|
| READ SINGLE | IS-S | |
| UPDATE SINGLE | IU-X | |
| READ SCAN | S- | |
| UPDATE SCAN | S- (ON READ) ID-X (ON MODIFY) | |
| INSERT | IIn-X; ID-X IF NEXT KEY IS LOCKED WITH ID-, S-, ID-S, ID-X | IIn- (INSTANT) |
| DELETE | ID-X (INSTANT) | ID- |

CONCURRENCY-CONTROL METHOD AND APPARATUS IN A DATABASE MANAGEMENT SYSTEM UTILIZING KEY-VALUED LOCKING

BACKGROUND OF THE INVENTION

The present invention is directed to resource-management systems and in particular to the locking strategies that they employ.

A resource-management system is typically implemented in a computer, including its various types of storage apparatus, programmed with appropriate software. A common type of resource-managment system, namely, a database-management system ("DBMS"), can be thought of as operating in two phases, the first of which may be called an design phase and the second of which may be called an execution phase.

FIG. 1 represents the design phase. In this phase, the DBMS 10 provides a database designer with ways of defining the "structure" of the data, i.e., the manner in which their storage is organized, and of defining transactions in which the data thus stored will be accessed by ultimate users.

The first function, performed in what we can call a "metadata manager" 12, typically responds to structure-defining (data-definition) commands entered by the designer in a high-level database language such as SQL. A relational DBMS, for instance, may accept a data-definition instruction of the following form:

CREATE TABLE INCOME

NAME CHAR (20),

INC DECIMAL (10,2)

SSN CHAR (9);

Such a statement may establish that the database will include a relation, or table, called "income," in which each tuple, or record, includes three attributes, or fields, including a "NAME" field in the form of twenty characters, an "INC" (income) field of ten decimal digits with a decimal point two places from the right, and an "SSN" (social security number) field in the form of nine characters.

The database designer may use similar statements to define other tables that the database will include. He may further define one or more indexes, whose maintenance he knows will be valuable in the use of the database. For instance, he may employ a command such as:

CREATE INDEX ON INCOME (INC);

to create an index of the records ordered by the values of the respective records' income fields.

The result of such commands is to cause entries reflecting them in a database catalog 14 that the DBMS creates and maintains for use in its access operations. Note that none of the foregoing activities provides actual database contents; attributes have been named, but no values of those attributes have necessarily been entered.

We will assume for present purposes that it is the end users who supply the database contents by various manipulating transactions. However, it is the database designer who defines the types of transaction routines that the end users invoke for this purpose. (Actually, a separate application programmer may perform this task. From here on, we will refer collectively to the various personnel, other than the end users, who operate on the database as the "definer.") That is, the definer generates transaction routines, which the DBMS's run-time system will perform in response to requests from end users. To produce these routines, the definer employs a group of DBMS modules to which we will refer as a "query compiler" 16.

The definer may write the transaction definition in a general-purpose language such as PL/1, but he will typically embed in the PL/1 program instructions written in the high-level database language, such as SQL, to which the DBMS responds. This can be done in PL/1, for instance, by preceding, say, SQL commands with "EXEC SQL," which is a signal that the overall PL/1 source code will have to be submitted to a precompiler before PL/1 compilation so as to strip out the SQL statements and replace them with appropriate subroutine calls. The stripped-out SQL statements would be presented to the query compiler, which would compile them into instructions that call upon the services of various operative modules within the DBMS's run-time supervisor.

A transaction-defining statement in the high-level database language may be in the form:

START TRANSACTION

SELECT INC

FROM INCOME

WHERE SSN="123456789"

COMMIT WORK;

When the routine specified by such a statement runs, it searches the database for a record in which the SSN (Social Security Number) field is 123 45 6789 and fetches the value in the income field of that record.

To compile this command, the query compiler 16 consults the database catalog, which contains the definer's definitions of the data organization, such as that "INCOME" is a relation and INC and SSN are two of its attributes. It also determines the best manner in which to search for the indicated information, and it employs the index information in order to do this. If, for instance, the definer has required that an index ordered by social-security number be provided, then the query compiler produces a transaction routine that accesses the record by way of that index. In such a situation, the SSN attribute is the "key" by which the system finds the desired record (or records).

It should be emphasized at this point that, although we depict the query compiler as operating in the design phase rather than in the execution phase, many of what will be described below as features of the query compiler are only implicit in most DBMS implementations until the execution phase is in progress. In particular, the typical query compiler places in the transaction routine 17 calls to operation subroutines chosen from a subroutine set resident only during the execution phase and commonly called by most transaction routines. Since the contents of these subroutines are all part of the translation from transaction definition to implementation instructions, we consider them features of the query compiler, and the remaining discussion will not distinguish between the functions that the query compiler performs directly during the design phase and those that its design-phase actions perform only indirectly, by calling existing subroutines resident during the execution phase.

Among the capabilities of many DBMSs is that of maintaining what is known as "serializability." In writing transaction definitions, the database definer is defining what will happen when an end user submits a request to the system. One resulting transaction routine, for instance, might be invoked by a user at an automatic teller machine to transfer money from one account to another. Another might be invoked by a bank executive from a management-information-system terminal to request the total of all account balances for a given branch of the bank. In each case, the end user submits his transaction request to a run-time supervisor 18 (FIG. 2), which calls the specified transaction routine. The transaction routine obtains records from a storage medium 19, such as a magnetic disk or cached copies of its contents, through the operation of a buffer manager 20. The actual central-processor time involved in each of these transactions may be very small, but the time required between the beginning and end of the transaction may be considerable, since time is usually required to await data from storage facilities, inputs from the human user, etc. In the operation of most large databases, it is therefore important that the central processor be freed to perform operations of other transactions between the individual operations of any single transaction. But this interleaving can cause problems if steps are not taken to prevent them.

For example, the ATM user's transfer of money from one account to another may actually be implemented in a number of operations, which may be interspersed with inputs from the user. The transfer involves the separate steps of removing money from one account and adding it to another. Similarly, the bank executive's transaction of obtaining account totals actually includes a number of separate operations, each of which involves reading an account balance and adding it to a running total. If these operations are interleaved, the account-totaling operation may copy the balance from the ATM user's first account before the transfer and from the second account after the transfer, and this would indicate to the executive that the bank total is greater than it actually is.

This would not result, of course, if the two transactions occurred serially. One of the functions of most large DBMSs is therefore to perform transactions in such a way that concurrently performed sets of them are serializable, i.e., that their results are the same as that of a series of non-concurrent transactions, without requiring actual serial transaction ordering. To this end, the query compiler usually causes the transaction routine to include certain operations that invoke the services of a DBMS module known as a "lock manager" 21, which is active in the execution phase depicted in FIG. 2 (and actually in the design phase, too, for purposes not relevant here) and maintains a lock table 22, whose contents indicate which "resources" are currently involved in transactions in such a manner that certain operations on them by other transactions must be postponed until the previous transactions have been completed. That is, if a transaction performed by such a routine includes an access to a certain resource, it will also request that the lock manager post a lock in the lock table identifying the designated resource as one to which access is restricted. (We use the more-general term resources instead of records for reasons that will become apparent. Until those reasons do become apparent, however, little harm results from reading "records" for "resources.")

When an end user invokes a transaction routine in the execution phase, that routine will request that the lock manager post a lock on the required resource. The lock request includes a "resource ID," which typically is, say, a hashed or otherwise encoded version of the key value, and an indication of the requested lock's "mode." (As will be explained below, locks can differ in their degrees of restrictiveness.) In response, the lock manager will consult the lock table to determine whether any lock has been posted for that resource ID. If so, it will consult its "compatibility matrix" to determine whether the requested lock is compatible with the already-posted lock, and the transaction that has requested the lock will be at least temporarily prevented from proceeding if the lock modes are not compatible. Otherwise, the lock manager will produce a positive compatibility indication and (except in certain "instant lock" cases that will be described below) enter a lock in the lock table, thereby restricting other transactions' access to the locked resource.

Of particular interest in the present context is what is known as "range locking." The serializability of some types of transactions is not assured by simply locking the several records to which they require access. An example of such a transaction is one that includes a scan operation, which accesses all records in which a certain attribute's values are within a specified range.

For instance, one transaction may be to find the total income within an income range. A concurrent transaction may be to insert records for a group of new taxpayers who first have reportable income within a given period. It is desirable that the computed total reflect either all or none of the new taxpayers, but individual record locking does not insure this result. If the insertion transaction inserts one record in a part of this range that the totaling transaction has already searched and another in a part that it has not, then neither transaction will encounter the other's locks, and the total-computing transaction's result will be erroneous. This results from the "phantom" records that were inserted into a range after that range's original occupants were locked.

To remedy this problem, database management systems must lock entities other than just records. For example, a DBMS may lock a whole file when a scan operation is performed in it. But such an expedient can produce a considerable reduction in the system's achievable concurrency, i.e., in the degree to which operations of separate transactions can be interleaved. Alternatively, therefore, DBMSs sometimes employ range locking, which treats not only individual key values but also key-value ranges as resources to be listed in the lock table. Therefore, when a transaction routine includes an operation directed to all records within a certain target key range, it causes the lock manager to post locks directed not only to the individual key values to which the transaction will obtain access but also to a set of lockable ranges that covers the target range. And, if another operation is directed to a specific key value, that transaction not only requests a lock on that key value but also has the lock manager check for locks on any lockable range into which that key value falls. This latter function is performed by additionally identifying any such range resource and requesting a lock on it.

The routine for inserting records of new taxpayers, for instance, would identify all ranges into which the records that it intends to insert fall, and it would check the lock manager to determine whether there are locks on these ranges. Since the total-computing transaction will have acquired locks on ranges into which the new taxpayer records would otherwise have been inserted, the record-insertion transaction is postponed until the total-computation transaction has been completed, and serializability is thereby maintained.

Note that the use of ranges as lockable resources does not change the lock manager. A conventional lock manager is quite simple. It does not have to "know" what kind of resource a resource ID represents. It needs to "know" only the compatibility matrix and the resource IDs against which it has already posted locks.

We digress at this point to note that locking a key value or range thereof is not the same as locking the record or records that the key value or range designates. The record identified by the name-attribute value John Doe may be the same as that identified by the social-security-number-attribute value 123 45 6789. But the key-value locking performed by an operation that uses John Doe as its key value and derives the resource ID from that value when it acquires a lock on it does not by itself restrict access to that record by an operation that requests a lock on the social-security number. Typically, of course, the operation will also perform further locking, such as record-ID locking, which will cause access to that record from other paths to be restricted. Indeed, one of the keys may in essence be the record ID. But we are not concerned with that here. Here we are concerned only with locking on the basis of a given key or range thereof, so we will refer to key-value or range locking, which may or may not be accompanied by or equivalent to record locking.

Although it is better than locking the whole file, locking ranges of key values can itself reduce concurrency significantly. To lessen this concurrency reduction, DBMSs employ more than one mode of lock, each lock mode differing from the others in restrictiveness. This restrictiveness variation is useful even if the DBMS does not use range locking. For example, a lock acquired by a transaction as a result of an operation that only reads records does not need to prevent other transactions from reading those same records, but a lock resulting from a write operation does. In recognition of this fact, a simple, two-mode locking system may employ lock-table entries that include an indication not only of whether a lock is in place but also of whether the lock is a share-mode ("S") lock, requested for read operations, or an exclusive-mode ("X") lock, requested by record-modifying operations. A transaction requesting an S lock will be deterred only by X locks on the target resource, not by S locks, while transactions that request X locks will be deterred by locks of both types.

Database systems that employ range locking often obtain additional concurrency by means of "multi-granularity locking," or MGL, which conventionally employs five lock modes, as FIGS. 3, 4, and 5 illustrate. FIG. 3 is a lock-mode table, which indicates the types of locks acquired by transactions in accordance with one application of the MGL scheme for the different types of database-access operations of which they may be comprised. In addition to the simple "covering" lock modes S and X, there are three "intention" lock modes, designated IS, IX, and SIX, whose purpose is to indicate, with respect to a key range, that a further, covering lock will be acquired on a key value that falls within that range. (Actually, the SIX mode, as will be seen below, is both a covering lock and an intention lock.)

FIG. 4 is an exemplary lock table that will be employed to explain intention locking. In the example, we will assume that one of the attributes in a relation defined for a given database is labeled "INC," for "income." That is, if the relation is thought of as a table, each row of the II table represents a taxpayer, and one of the columns represents those taxpayers' incomes. Let us further assume that the database designer has required (not necessarily in principle but nearly unavoidably in practice) that an index be maintained of incomes and that he has further specified that the DBMS is to treat certain predetermined ranges of incomes as lockable resources. The reason for this may be that a purpose of the database is to support studies of characteristics of various predetermined income ranges.

Now, suppose that a user calls for performance of a transaction routine for totalling all incomes within the $30,000–$70,000 income range and that the database designer has specified two predetermined ranges of $30,000 to $50,000 and $50,000 to $70,000. The DBMS's run-time supervisor responds to this request by running the requested transaction routine and assigning this instance of that routine's operation the transaction name $T_1$. Since transaction $T_1$ will need to read all records within the two ranges but not to update any of them, it requests S locks on the two ranges, as the first row of the FIG. 4 table indicates. The S lock is a covering lock, since it implicitly locks each key value in the range. But the transaction does not explicitly place a separate lock on each key value—i.e., each income level—that it finds, since the query compiler will have so designed any transaction routine that similarly searches for records by income as to cause the lock manager to check the income range into which the indicated income falls.

The "read scan" entry in the FIG. 3 mode table reflects this lock-mode selection. It shows that, upon a scan-type read operation, i.e., one which requests all records within a given range, a lock of the S type is acquired on the range or ranges involved but not on the individual key values.

As FIG. 5 indicates, lock mode S is compatible with only two lock modes, IS and S. The latter compatibility is exemplified by a concurrent transaction ("$T_2$"). Transaction $T_2$ requires access to the S-locked ranges, but only to read them, so it requests S-mode locks of those ranges. The lock manager, which implements the compatibility table of FIG. 5, informs $T_2$ that the requested lock mode is compatible with the existing (S-mode) locks on those ranges in its lock table. It therefore posts the lock, as the FIG. 4 lock table indicates in the $T_2$ row.

To observe compatibility of the S mode with the IS mode, let us consider a transaction ("$T_3$") whose purpose is to fetch, say, the identity of the taxpayer whose income is $39,547. This involves a "singleton read" operation, i.e., one that targets an individual key value, not a range, although the key value may fall within a range. As FIG. 3 indicates, the query compiler requires such an operation's transaction to request not only an S lock on the actual key value to which this operation is directed but also an IS lock on any range in which that key values falls. Accordingly, as FIG. 1 shows, $T_3$ acquires an S lock on income value $39,547 and an IS lock on income range $30,000 to $50,000. The lock manager grants this lock, even though locks have already been acquired on that income range, because the lock manager's compatibility matrix (FIG. 5) indicates compatibility between the IS and S locks.

The IS lock is not a covering lock: the operation that caused it is not directed to the range against which the IS lock is posted. Instead, it is an intention lock: it indicates the intention to acquire a lock on a different resource, namely, a key value, that the range includes (or, for some resources, otherwise overlaps). Its purpose is to prevent another transaction from acquiring a covering lock on the range that would be inconsistent with the first transaction's access to the included (or overlapped) resource.

The difference between the IS and S locks becomes apparent when one considers a new transaction $T_4$, whose purpose is to correct the income value for the taxpayer whose income is $41,290. This is a "singleton update," and FIG. 3 indicates that the involved range and key value must be locked in modes IX and X, respectively. FIG. 4 shows that no previous transaction has obtained a lock on the key value of $41,290. But that value falls within the $30,000 to $50,000 range, on which previous transactions have already acquired locks, and the mode, S, of two of those locks is incompatible with the IX-mode lock that transaction $T_4$ requests on that range. Transaction $T_4$ therefore cannot proceed until the S-lock-holding transactions $T_1$ and $T_2$ have ended, either by aborting or by running to completion, i.e., in database parlance, by "committing."

Now, let us suppose that transactions $T_1$ and $T_2$ commit. A committing transaction notifies the lock manager, which responds by removing the transaction's entries. FIG. 4 uses checkmarks to represent such removals for transactions $T_1$ and $T_2$. The only lock remaining on the $30,000 to $50,000 range after transactions $T_1$ and $T_2$ commit is therefore the IS-mode lock acquired by transaction $T_3$. Remember that transaction $T_3$ requested only an IS-mode lock on the range, since it did not need to read all of the range but only needed to indicate that it would be reading something within the range. Thus, as FIG. 3 indicates, the IS mode is compatible with the IX mode requested by transaction $T_4$ on the $30,000 to $50,000 range. After transactions $T_1$ and $T_2$ have committed, therefore, transaction $T_4$ can acquire the locks that it requires before it will proceed.

Note that transaction $T_4$ acquires a different, X-mode lock on the particular key value, $41,290, to which its singleton update operation is directed. This mode is incompatible with the S-mode lock acquired by $T_3$, but there is no interference, because the two transactions' S- and X-mode locks are directed to different resources. If $T_4$'s update operation were instead directed to the income value $39,547, on which transaction $T_3$ has acquired a lock, the requested locks would not have been granted to $T_4$; if this were not so, $T_4$ would be allowed, contrary to the serializability requirement, to modify a record that transaction $T_3$ is reading.

The remaining lock mode in FIG. 5, SIX, has a compatibility combination that is the intersection of those of the S and IX modes: it is compatible with IS, with which S and IX are compatible, but it is not compatible with IX or S, since IX is not compatible with the latter and S is not compatible with the former. This is the mode requested by an "update scan" operation, which scans all records within a target range and updates any that meet a predetermined criterion.

For instance, if the records have as an additional attribute the name of the taxpayer's state, a transaction may be to correct a reporting anomaly by adding a fixed amount to the income field of each Kentucky taxpayer whose income falls within an income range of $35,000 through $60,000. Although the particular requested range is not among the resources that the database has been arranged to lock, the required serializability can be insured by locking the two illustrated ranges, which together include the requested range. This operation is in essence both a read scan and a series of singleton updates. The query compiler therefore causes such transaction routines to request that the ranges involved be locked in the SIX mode, which both prevents all transactions prevented by the S-mode lock and prevents all transactions prevented by the IX-mode lock. As FIG. 3 shows, such transactions additionally request X-mode locks on the individual key values that are in fact updated.

To complete our discussion of this particular type of range locking, we comment on two further details. The first is that the IS-mode range lock in the first row in FIG. 3 is only implicit in some implementations: in those implementations, the transaction does not actually request this lock and the lock manager does not post it. As reference to the compatibility matrix of FIG. 5 reveals, the only locking mode with which mode IS is incompatible is the X mode, which, as FIG. 3 shows, is ordinarily requested only for individual key values, not for ranges. Therefore, so long as the query compiler does not produce transaction routines that request X locks on ranges, a singleton read transaction does not need to acquire a range lock. But some MGL systems may save lock overhead by, say, locking the range in the X mode for insert and delete operations and thereby avoiding the need to acquire a key-value lock. In such arrangements, the IS lock mode would have to be explicit.

Incidentally, if the use of the X mode is to be restricted, as it is in FIG. 3, to key values rather than ranges, then it can be replaced with the SIX mode, which is incompatible with the only other mode used for key values, namely, the S mode.

The second detail is that, although FIG. 3 primarily describes the action of the query compiler and the routines that it generates, while FIG. 5 characterizes the lock manager, certain aspects of FIG. 3 can instead be implemented by the lock manager. Specifically, the first range-lock entries in FIG. 3 for singleton updates, inserts, and deletes are all IX. This is the lock mode that a transaction requests if that same transaction has not previously obtained an S-mode or SIX-mode lock on the same resource. If it has obtained such a lock, on the other hand, it acquires an SIX-mode lock instead of an IX-mode lock. It can be the transaction routine's responsibility to make this substitution, but one usually would incorporate this function in the lock manager instead.

It can be appreciated that range locking of this type eliminates the phantom problem yet affords considerable concurrency. As the last example indicates, however, the use of such definer-specified ranges is somewhat inflexible. Specifically, the target income range mentioned above for the Kentucky anomaly did not fit the predetermined ranges very closely, and locking enough predetermined ranges to cover the target range resulted in less concurrency than would have been possible if there had been a closer fit. Additionally, the approach to MGL just described requires considerable locking overhead, since it requires that two resources, namely, a key range and an individual key value, be separately locked for most operations.

A system that deals with these problems is the ARIES/KVL system described in Mohan, "ARIES/KVL: A Key-Value Locking Method for Concurrency Control of Multi-action Transactions Operating on B-TREE Indexes," *Proc. Very Large Databases Conference*, Brisbane, Australia (August 1990). This system dynamically re-defines key-value ranges in accordance with the current population of key values. Specifically, the system maintains a key-value-ordered index, and the possible lockable ranges are the ranges between each pair of successive key values that currently exist in the index. That is, if the existing key values are $k_1, k_2, \ldots, k_i, \ldots$ such that $k_i < k_{i+1}$, then the ranges are the disjoint semi-open intervals $(k_i, k_{i+1}]$, and each such range is identified by the upper bounding key value. Equivalently, of course, the range could be identified instead by the lower attribute value, in which case the range would be open at the top rather than at the bottom. Since locking granularity is finer if the ranges are disjoint, it is preferable for one end of the interval to be open. A lock-request resource identifier in this system identifies both a key value and the ranges that the key value represents. This enables a transaction to lock with a single lock request both a range and the key value that represents it.

FIG. 6 lists the lock modes required in the ARIES/KVL system for the various operations that a transaction might include. Unlike FIG. 3, FIG. 6 includes only one column for the first four operations listed, because an ARIES/KVL operation does not separately lock key values and key ranges. The locks listed in FIG. 6 are roughly the more restrictive of the range and key locks required by the system of FIG. 3 for the same operations. FIG. 6 does include a second column for insert and delete operations, but this does not indicate that key values and ranges are locked separately for these operations. Instead, it represents a separate lock on what will be described below as the "next" key value/range.

This is necessitated by the fact that inserting and deleting records in a KVL system divides or extends existing key ranges.

Suppose that a record having a key value of $k_i$ is to be deleted. Clearly, one transaction's deletion of a record that has been written, read, or inserted by a second uncommitted transaction potentially compromises the serializability of those transactions. Therefore, an operation that deletes $k_i$ should not be permitted if another transaction has any lock on $k_i$, regardless of the mode of that lock. A deleting transaction accordingly tests for any such lock by requesting an X-mode lock on $k_i$. FIG. 6 includes the "instant" notation to indicate that the transaction need only request a compatibility indication and not actually acquire the lock, for a reason that will presently become apparent.

As FIG. 6 shows, the deleting transaction requests a lock not only on the targeted key value/range but also on the "next" key value/range, i.e., on key value/range $k_{i+1}$, which includes the range previously represented by the deleted key value $k_i$. Since that range has now been modified, no access to it should be permitted. The lock acquired on range $k_{i+1}$ is therefore an X-mode lock.

For an insertion, on the other hand, the requested locks are not so restrictive. Let us suppose, for instance, that an inserting transaction is to insert a new key value $k_i'$ between $k_i$ and $k_{i+1}$. This will reduce the width of the range previously represented by key value $k_{i+1}$, so range $k_{i+1}$ must be checked for locks. For this purpose, ARIES/KVL uses an instant lock in the IX mode if the inserting transaction has not previously locked that key/range. Clearly, if that range had been, say, scanned by another uncommitted transaction, as indicated by an S, X, or SIX lock, that range should not be modified by inserting a new record into it. Testing by means of an IX-mode lock prevents this. However, there is no reason why the $k_i'$ record cannot be inserted by one transaction just because another uncommitted transaction has previously inserted the $k_{i+1}$ record, as indicated by a previously existing IX-mode lock. Since the requested IX-mode lock is compatible with an IX-mode lock, such an insert in front of another insert can occur. (In front of and behind are defined by the direction in which key-valued ranges extend: a range extends in front of the key value that represents it.) The inserting transaction requests only an instant lock on $k_{i+1}$ because there is no reason why one transaction's insertion of $k_i'$ should prevent another transaction's access to $k_{i+1}$.

It is now apparent why the current-key-value/range lock required by a deleting transaction can be instant: subsequent insertion of a record having the deleted key value is prevented by the delete operation's next-key-value/range lock, which is incompatible with the next-key-value/range lock requested by the insert transaction.

Remember that the lock manager tests for compatibility only with existing locks of other transactions; if an inserting transaction has itself previously acquired an S, SIX, or X lock on the next key value $k_{i+1}$, the lock manager does not produce an incompatibility indication even though the IX lock requested for that key is incompatible with those modes. Yet, because an insertion divides the range previously identified by $k_{i+1}$, on which the requesting transaction has acquired such locks, provision must be made to insure that the entire previous range remains locked at least as restrictively after the insertion as it was before. Instead of IX, therefore, the lock on inserted key value $k_i$ is in mode X if the locking transaction has previously acquired an S-, SIX-, or X-mode lock on the next key value $k_{i+1}$.

As was stated above, the ARIES/KVL system differs from the previously described MGL system. Instead of employing a fixed set of lockable ranges that is independent of the current population of existing key values, it dynamically so redefines the lockable ranges as key values are added and removed so that the currently existing key values bound the currently lockable ranges. This contributes to concurrency, because it tends to result in ranges whose granularity more nearly equals the required granularity.

SUMMARY OF THE INVENTION

We have recognized, however, that the ARIES/KVL system additionally employs a feature that tends to reduce concurrency. Specifically, the resource identifiers that it employs in its lock requests do not distinguish between key values and the ranges that they represent, so a whole range can sometimes be locked when it is only necessary to lock a single key value. In so doing, ARIES/KVL system incurs a concurrency penalty. But the range-definition approach used in ARIES/KVL, which we will call "key-value locking" ("KVL"), can be implemented in a system that, like the other MGL approach described above, locks key values and ranges separately. Such a system would yield greater concurrency.

We have further recognized that concurrency can be increased even over that obtainable in such a system, and we have achieved this additional concurrency by using a different set of lock modes, a set in which the number of modes is great enough that all the concurrency achievable in a KVL system by the conventional MGL mode set is maintained, while the modes of the locks on ranges required by update and scan operations, and on the "next" ranges by insert and delete operations, all differ from one another in transactions that have obtained no previous locks on those resources. With such a set of lock modes, the mode of the lock obtained on the next range by a delete operation can be incompatible with that of an insert operation's next-range lock and still be compatible with that of the range lock acquired by an update operation, with which that of the lock acquired by a scan operation must be incompatible.

This yields concurrency that the conventional MGL mode set does not: it permits updating of a record whose key represents a range that has been widened by an uncommitted transaction's delete operation. We have found that this result can be achieved by replacing the conventional IX mode with three separate modes, which we call IU, IIn, and ID, and using them in place of the IX mode on update, insert, and delete operations, respectively.

Moreover, by adding still further lock modes, this concurrency can be obtained even in systems in which lock requests employ identical resource identifiers for key values and the ranges they represent. By adding enough lock modes to achieve certain further compatibility combinations, which will be set out in more detail below, one can enable such systems to perform certain operations that the ARIES/KVL system prohibits. Specifically, embodiments of the present invention can delete or insert records whose key values immediately precede those of records read or updated by uncommitted transactions, and they can read or update records whose key values represent ranges divided or extended by operations of uncommitted transactions. We have been able to achieve these combinations by using a total of eight lock modes.

BRIEF DESCRIPTION OF THE DRAWINGS

These and further features of the invention are described below by reference to the accompanying drawings, in which:

FIG. 3 is a lock-mode table that characterizes a type of prior-art DBMS query compiler;

FIG. 4 depicts an exemplary lock table maintained by a lock manager;

FIG. 5 is a compatibility table that characterizes certain prior-art lock managers;

FIG. 6 is a lock-mode table that characterizes the query compiler of another prior-art DBMS;

FIG. 7 is a compatibility table that characterizes a lock manager employed in one embodiment of the present invention;

FIG. 8 is a lock-mode table that characterizes a query compiler employed in the same embodiment;

FIG. 9 is a compatibility table that characterizes the lock manager of another embodiment of the present invention;

FIG. 11 is a table of the concurrencies that the teachings of the present invention enable a DBMS to achieve.

DETAILED DESCRIPTION OF ILLUSTRATIVE EMBODIMENTS

Figure 1:
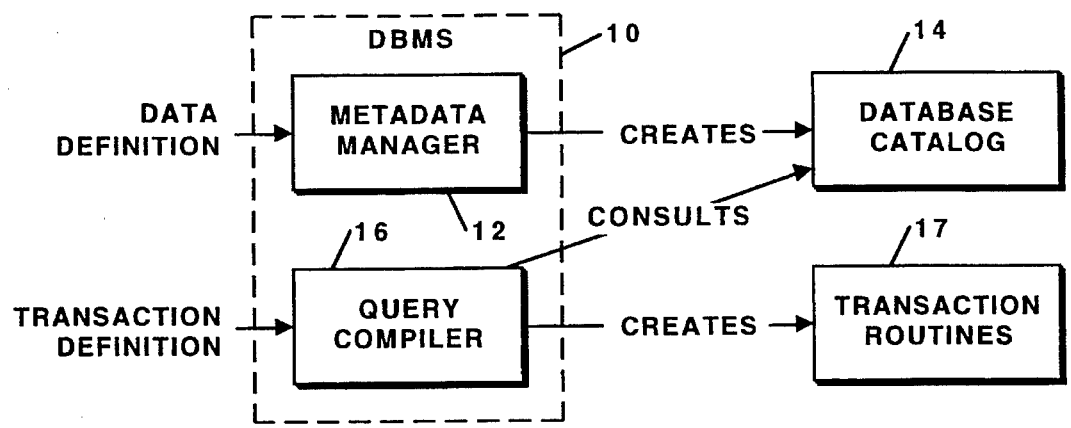
FIG. 1 is a block diagram that depicts parts of a DBMS that a definer uses during database design.
Figure 2:
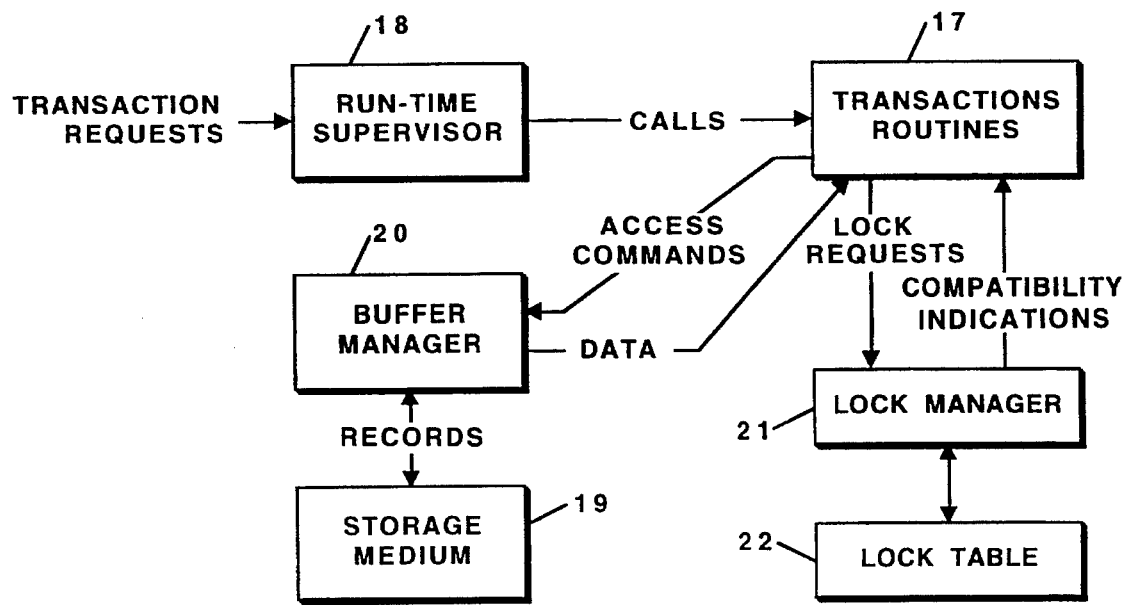
FIG. 2 is a block diagram of parts of a DBMS employed to respond to requests from an ultimate user.

The compatibility matrix of FIG. 7 and lock-mode table of FIG. 8 characterize the lock manager and query compiler of one embodiment of the present invention. Before we proceed with a description of this new DBMS, however, we should make more explicit the aspect of the locking process to which the present invention is directed. The following discussion therefore explains that the present invention is directed to the range and key locking that occur in a single path employed to access the database.

A database-management system provides access to a database by requesting the file manager in its host computer system to add, retrieve, or replace records whose storage on computer disks or other storage media the file manager (indirectly) controls. The DBMS specifies these records by respective unique record IDs. An operation in a transaction routine, on the other hand, typically specifies desired records by means of a key. In the case of a primary key, the key is an attribute (or group of attributes) that is essentially the same as the record ID in the sense that records whose key values are adjacent are clustered in close proximity. But a key may instead be an attribute, or combination of them, whose corresponding records are physically scattered.

If the system is to avoid a linear search when a key other than the record ID is used, the database designer will have to have directed that an index on the key be maintained, i.e., that the system maintain a file in which each entry has key field and a pointer field and in which the entries are ordered by the value in the key field and hence clustered. For instance, the definer may require that the system keep a taxpayer-name index, in which the key field in each record contains a name and the pointer field in that record typically contains a pointer to the record in the database proper that contains that name. In principle, however, the pointer can be the value of a key in a further index, which will also have to be consulted to find the target record.

An operation thus can in principle proceed through a number of keys, including the record identifier, and it could-acquire another lock for each new key. Moreover, most databases provide more than one such path; i.e., they allow different sequences of one or more keys to be used for searching. The teachings that follow can be applied to any leg of any path.

It should also be understood that, although the description of the invention will refer only to the key values (and ranges thereof) as the locked resource, the invention is applicable to any lockable resource of which a key value or key range is a component. For example, one can conceive of a DBMS in which the resource identifier used in a lock request can differ in accordance with the source operation's target attribute: for an operation that is to access target attribute A in the record identified by key value k, the system may use a resource identifier different from the one used for a request from an operation that is to access a different target attribute B in the record identified by the same key value. In such a case, the resource identifier used in the lock request would be determined by the combination of key value and attribute, but range locking would still be possible. Therefore, although the following description will not separately consider systems that distinguish locked resource not only by key value but also by target attribute, the teachings of the present invention are applicable to such systems, too.

It should be further understood that the term key has a broader meaning in the context of the present invention than it does in some other contexts. Clearly, an attribute or attribute combination has usefulness as a key if its values can be ordered and thus used for non-linear searching, and its use in the literature has obviously resulted from keys used in indexes for this purpose. But the term key has sometimes been limited to an attribute or combination thereof whose values uniquely identify records in a relation. Use-of the present invention is not restricted to unique keys, so we do not so limit that term here. However, statements herein concerning maximum possible concurrency are based on the assumption that the keys are unique; for non-unique keys, it may be possible to modify the illustrated embodiments so as to achieve even greater concurrency.

Moreover, a key as used in the present context need not be limited to those derived from attributes or used in an index. Not all scans employ indexes, because not all attributes are indexed, and not all predicates controlling a scan can make effective use of an index. For these scans, one needs to search through an entire file. These scans may need to guard against phantoms, just as index scans do. For this purpose, the key from which a lock request's resource identifier is derived could be the record ID, and a range lock on that ID would be interpreted as locking the thus-identified record and the entries physically disposed between it and its immediate physical predecessor. Such a key would not necessarily be related to any attribute—the file may be a heap file, for instance—but it could clearly be used for range locking.

Finally, it should be recognized that, although the present invention is directed to key-valued locking, it is not restricted to systems in which ranges are defined a they are in the ARIES/KVL system. As was stated above, key-valued locking employs ranges that are bounded by successive existing key values. But it is possible for a KVL system to use additional values, too, to define key-value ranges. To avoid ranges that bridge index pages, for instance, a KVL system may additionally use index-page boundaries to define ranges, as is disclosed in our commonly assigned U.S. patent application entitled Key-Range Locking with Index Trees and filed on even date herewith, which we hereby incorporate by reference.

Furthermore, ranges in a KVL system may in fact overlap even though they are defined by successive key values. The same Lomet et al. application discloses a method of using key-valued locking with "bounded disorder" indexes, in which the index trees' leaf nodes consist of pluralities of separately accessible "buckets." The leaf nodes are ordered, as are the entries in each bucket, but the entries within a node are hashed to distribute them among the buckets, which thus are not ordered among themselves within a node. In using key-valued ranges with bounded-disorder indexes, we employ ranges that extend between successive key values in art index bucket, so the resulting ranges overlap. Non-scan operations lock only ranges defined by the index values in the index buckets to which they are directed, while scan operations lock all buckets' ranges that overlap the scan operations' targets. The present invention is applicable to all such KVL systems.

We now turn to a description of the first illustrated embodiment. As FIG. 7 shows, the new set of lock modes replaces the IX mode with three different modes, to which we refer as modes IU, IIn, and ID because they are respectively used with Update, Insert, and Delete operations. The compatibilities of these modes with the remaining modes, namely, with modes IS, S, SIX, and X, are the same as those of the replaced mode IX. However, they are distinct lock modes because their compatibilities among themselves differ.

As FIG. 8 indicates, the IU-mode lock is acquired on a range when the operation that necessitates it is a singleton update of the record whose key forms the upper bound of that range. (As was noted above, ranges can instead be represented by their lower-bound key values, but we will use upper bounds in this discussion for the sake of example.)

An IIn-mode lock indicates that the range thus locked has as its upper bound a key inserted by the transaction that holds the lock. An, insert operation causes a range to be divided. As FIG. 8 indicates, an insert operation places an IIn-mode lock on the next range; i.e., the insert-next-range mode in this scheme is IIn, rather than IX, as it is in that of FIG. 6. Suppose, for example, that a transaction includes an insert operation by which a new record whose key value is $k_i'$ is to be inserted between existing records having key values $k_i$ and $k_{i+1}$. The transaction will request an instant IIn lock on the range from $k_i$ to $k_{i+1}$ to determine whether that range has a conflicting lock, which, as FIG. 7 indicates, can be an ID, S, or SIX lock. (The IIn lock is not compatible with lock mode X, either, but the X mode is not employed on ranges.) If the range represented by $k_{i+1}$ is not locked incompatibly by some other transaction, then the new key value $k_i'$ is inserted between $k_1$ and $k_{i+1}$.

The lock on the range denoted by $k_{i+1}$ can be instant—i.e., the lock manager can check for its compatibility with other transactions' locks without actually posting it—because (i) the instant lock is sufficient to trigger an incompatibility indication and thus prevent the requesting transaction if there is an incompatible lock on the $k_{i+1}$ range, into which $k_i'$ is to be inserted, and (ii) if insertion does proceed— because the $k_{i+1}$ range was not previously locked by other transactions—the $k_{i+1}$ range will thereby be so shortened that the inserted key value $k_i'$ is not in the $k_{i+1}$ range, so that range requires no lock. The new key value $k_i'$, to which access by other transactions must of course be denied until the locking transaction commits, is now in a range identified by $k_i'$. This new range is locked in mode IIn unless the locking transaction has previously acquired a lock of mode ID, S, or SIX on the next, $k_{i+1}$ range.

The latter eventuality is possible even though the ID, S and SIX modes are all incompatible with the IIn mode requested for the next lock range, because the lock manager tests for: incompatibility only with locks held by other transactions. Therefore, the locking transaction would proceed even if it had, for example, previously deleted a key value in front of $k_{i+1}$ and were thus holding an ID-mode lock on the next range. Since the deleted a key value may have fallen in the part of the old $k_{i+1}$ range that will now be in the new $k_i'$ range, however, the new $k_1'$ range should be locked accordingly. So if the inserting transaction holds an ID-mode lock on range $k_{i+1}$, the range represented by the new key $k_i'$ inserted in front of it will be locked in the ID mode instead of in the IIn mode. Similarly, a previous lock of mode S or SIX will result in an SIX-mode lock in response to an IIn-mode request.

We now turn to a discussion of the ID mode, which is used for delete operations. A delete operation merges two ranges. That is, if key value $k_i$ is deleted, then previous ranges $(k_{i-1}, k_i]$ and $(k_i, k_{i+1}]$ are merged to form a new range $(k_{i-1}, k_{i+1}]$ represented by key value $k_{i+1}$. As FIG. 8 indicates, the delete operation begins by requesting a (commit-duration) ID lock on the next range, namely, on $(k_i, k_{i+1}]$. As FIG. 7 shows, ID is incompatible with modes S and SIX, among others. Requesting the ID lock on the next, $k_{i+1}$ range therefore insures that the deletion does not occur in a range that another transaction has scanned. Review of FIG. 7 also reveals that requesting an ID lock on the next, $k_{i+1}$ range for an operation in which $k_i$ is to be deleted prevents that operation from going forward if another transaction holds an IIn or ID lock on that range, indicating that $k_{i+1}$ was inserted by an uncommitted transaction or that it currently defines a range whose width results from the deletion by an uncommitted transaction of a key value lower than $k_{i+1}$.

To understand why deletions should be prevented in these situations, consider what could happen if a first transaction inserted a key value $k_{i+1}$ and a second transaction were then allowed to perform a deletion of $k_i$, and thereby widen the range that $k_{i+1}$ represents, before the first transaction commits. When the second transaction deletes $k_i$, it must place a lock on $k_{i+1}$ to guard the resulting, now-modified range. Now, there are many reasons why a transaction that has begun may abort, and "atomicity" considerations require that the already-performed operations of an aborted transaction be "rolled back." If the first transaction aborts, the roll-back operation removes $k_{i+1}$, which was inserted by that transaction, and no visible lock remains to guard the range modified by the first transaction's insert operation. To prevent this possible compromise of serializability, a lock manager characterized by the compatibility table of FIG. 7 properly gives an incompatibility indication to an ID-requesting transaction if another uncommitted transaction has an IIn lock on the target of the requested ID lock.

Now let us consider what would happen if, instead of being characterized by the compatibility matrix of FIG. 7, the lock manager were to indicate the compatibility of ID with ID. Suppose that a first transaction obtains an ID lock on $k_i$ as part of the operation of deleting $k_{i-1}$. Suppose further that a second transaction includes an operation by which key value $k_i$ is to be deleted, and it therefore requests an ID lock on the range represented by $k_i$. When the second transaction initially requests the lock on the range represented by key value $k_i$, the range represented by $k_i$ is $(k_{i-2}, k_i]$, since the first transaction has already deleted $k_{i-1}$. If deletion of $k_i$ were then permitted, the resulting range represented by $k_{i+1}$ would be $(k_{i-2}, k_{1+1}]$. If the second, $k_i$-deleting transaction then performs a further operation in which it reads a range that encompasses $k_{i-2}$ and $k_{i+1}$, that transaction would need to acquire a lock on the range represented by $k_{i+1}$ so that, among other things, the entire range $(k_{i-2}, k_{i+1}]$ would be guarded.

Now, if the first, $k_{i-1}$-deleting transaction aborted, the resulting atomicity-preserving rollback operation would re-insert $k_{i-1}$. This would divide the previous $(k_{i-2}, k_{i+1}]$ range so that the lock acquired by the second transaction's scan of the range represented by $k_{i+1}$ would no longer guard the entire scanned range. To prevent such a result, the ID lock is incompatible with itself in the illustrated embodiment.

This embodiment of the invention results in concurrency that is higher than that obtainable with the conventional MGL mode set. Specifically, it permits a transaction to update a record whose key value bounds a range in which an uncommitted transaction has deleted a record. But it also requires more locking overhead than, for example, the ARIES/KVL system, since it requires separate range and individual-value locks. In accordance with another embodiment of the invention, this greater concurrency can be retained even for systems that, like the ARIES/KVL system, employ a common resource identifier for a key value and the range that it bounds, i.e., that do not lock key values separately from the ranges that they represent.

Part (although not all) of the greater concurrency of the previously described embodiment in comparison with ARIES/KVL results from the fact that, since it locks key values and key ranges separately, it can place a lock on each that is only as restrictive as the individually locked resource requires; it need not apply to both what is essentially the more restrictive of the two individually required locks. In the embodiment described below, we achieve this ability to discriminate, even in a system in which resource identifiers for ranges are the same as those for key values that represent them, by expanding the lock-mode set further.

In accordance with this embodiment, the lock modes are so defined that each can be thought of as representing a pair of the FIG. 7 modes, one member of the pair being applicable to the locked key value and the other being applicable to the locked range. The mode applicable to the range can be an intention or a covering lock, while the key lock mode can be any simple covering lock mode or the null lock mode.

FIG. 9, which is the compatibility matrix for these "composite" lock modes, names the lock modes as pairs of "constituent" range and key lock modes. For example, a lock of mode ID-X on a resource denoted by $k_i$ can be thought of as locking the range $(k_{i-1}, k_i]$ in mode ID and the key value $k_i$ in mode X. The compatibility combination of each mode in FIG. 9 is the direct result of composing the separate lock compatibilities of the range and key-value modes that it represents. That is, if each mode is thought of as a combination (range mode, key mode), then (range mode$_1$, key mode$_1$) is compatible with (range mode$_2$, key mode$_2$) if and only if range mode$_1$ is compatible with range mode$_2$ and key mode$_1$ is compatible with key mode$_2$.

Eight lock modes result. There are only eight distinct modes in FIG. 9—although some have been given more than one name for conceptual purposes—for reasons that are best understood after a review of FIG. 10, which lists the modes requested by various operations.

Figures 10, 12:
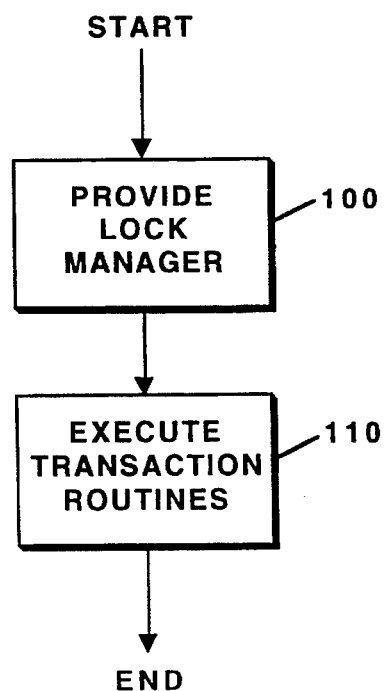
FIG. 10 is a lock-mode table that characterizes the query compiler of the same embodiment.
FIG. 12 is a flow diagram illustrating the method of the present invention.

The first column of FIG. 10 is largely the result of combining the first two columns of FIG. 8; for example, the modes in those two FIG. 8 columns for the first, singleton-read row are IS and S, while the corresponding mode in FIG. 10 is IS-S. Similarly, the second column of FIG. 10 largely follows from the third column of FIG. 8.

For the insert operation, however, the first column of FIG. 10 lists only IIn-X and ID-X, but it does not list SIX-X, as might be expected in light of FIG. 8, because SIX-X and ID-X are not distinct modes: their compatibility combinations are identical. Like FIG. 8, FIG. 10 lists only the mode that results when the requesting transaction has not already acquired a lock on the same resource. But it is worth noting that upgrading of locks is sometimes required.

For instance, suppose that a first operation's delete operation has, as FIG. 10 indicates, placed an ID- lock on the key value behind the deleted key, i.e., on the "next key" referred to in FIG. 10. Further suppose that the same transaction thereafter performs a singleton-read operation directed to the record designated by that next key value. That "next key" in the delete operation is the "current key" in the singleton-read operation, so the first lock mode requested for that key value (and for the range that it represents) is ID-, while the second is IS-S. A review of FIG. 9 reveals that the intersection of these two modes' compatibility combinations is the set consisting only of IS-S. The lock mode having this compatibility set is ID-S (also known as SIX-), so the ID-S mode, rather than the IS-S mode indicated in FIG. 10, is the type of lock acquired for this singleton-read operation. FIG. 9 also indicates that if the second operation had been a singleton update rather than a singleton read, the resultant lock mode would have been ID-X (also known as SIX-X), since its compatibility set—i.e., the null set—is the intersection of those of the ID- and IU-X lock modes.

It can now be understood why we need only eight modes: these are the only ones that can result from individual FIG. 10 operations or sequences thereof.

The concurrency that results from this eight-mode embodiment, in which lock request resource identifiers do not distinguish between a given key value and the key-value range that it represents, is equal to that of the previous, six-mode embodiment, in which range and key resource identifiers differ. Moreover, we believe that this concurrency is the maximum permissible in KVL systems employing conventional lock managers and unique keys. (It is at least theoretically possible to reduce lock restrictiveness and thus increase concurrency when non-unique keys are employed.) The concurrency improvement afforded by the present invention can be appreciated by reference to FIG. 11.

FIG. 11 depicts what we believe is the maximum permissible concurrency in such systems. "Y" for yes indicates that concurrent execution is permissible, while "N" for no indicates that exclusion is required. The operation notations should be dear in view of the previous discussion, and the "locked items" notations are largely self-explanatory. As an example, the "N" in the "insert range" column of the "read record" row means that serializability cannot be guaranteed unless a transaction is prevented from reading a record identified by a key value inserted by another uncommitted transaction. Similarly, the "Y" in the "delete range" column of the "update record" row means that there is no reason to prevent a first transaction from updating (modifying) a record identified by a key value that represents a range from which a record has been deleted by an uncommitted transaction. The "[ifo]" means "in front of" a read or updated record. This does not mean that the insert or delete operation would not be permitted at a position that is behind a read or updated key value. It merely means that there is no reason in general to prevent insertion of a key value into a range theretofore represented by a key value that has been read or updated, and there similarly is no reason in general to prevent a deletion that extends the range represented by an index value whose record has been read or updated.

As was stated above, both illustrated embodiments of the present invention achieve the full concurrency indicated by FIG. 11 as being permitted. In contrast, the six entries marked "1" represent concurrencies achieved by the present invention but not by the ARIES/KVL system, which, as was mentioned before, merges key and range resources and uses only the conventional MGL mode set. The "2" notation identifies the result thus marked as one that we do not believe can be achieved in key-value locking employing the conventional MGL modes even if the range and key resources are not merged.

Thus, the present invention provides a way to increase concurrency without significant additional locking overhead. It therefore represents a significant advance in the art.

Referring to FIG. 12, a flow diagram of the present invention shows that at step 100 a lock manager is provided. As stated previously, the lock manager is characterized by a predetermined compatibility matrix that indicates, for a number of composite lock modes, which pairs of the composite lock modes are compatible with each other, the lock manager maintaining a lock table that identifies locked database resources and the composite lock modes in which they are locked, receiving lock requests that designate resources and composite lock modes in which those resources are to be locked, and responding to the lock requests by generating compatibility indications that indicate whether the lock modes designated by the lock requests are compatible in accordance with the compatibility matrix with the lock modes of locks acquired by other transactions on the database resources that the lock requests designate. At step 110, the transactions routines are executed. The transaction routines perform respective transactions, each transaction routine comprising instructions that implement database-access operations, associated with respective database accesses, that apply lock requests to the lock manager and perform the associated database accesses only if the compatibility indications generated by the lock manager in response to the lock requests are positive, the resource identifiers in the lock requests being so mapped from the resources of the first and second types that each resource of the second type is mapped to a resource identifier the same as that to which the resource of the first type associated therewith is mapped, the database-access operations implemented by the instructions of the plurality of transaction routines including a set of operations that includes a plurality of operations of which each requires locks both on at least one resource of the first type and on the resource of the second type with which it is associated, the lock requests applied to the lock manager by the instructions that implement such a transaction's operations requesting, in the absence of an already existing lock acquired by the given transaction, a composite lock whose mode is associated with constituent first-resource-type and second-resource-type lock modes whose compatibility sets within a set of constituent lock modes would be sufficient to maintain serializability if the constituent first-resource-type and second-resource-type lock modes individually locked the resources of the first and second resource types, respectively, on which that operation requires locks, a given composite lock mode being compatible with another composite lock mode if and only if the constituent first-resource-type and second-resource-type lock modes associated with the given composite lock mode are respectively compatible with the first-resource-type and second-resource-type lock modes associated with that other composite lock mode.

We claim:

1. For managing a database of accessible records that contain resources of first and second types, each of a plurality of the resources of the second type being uniquely associated with a respective resource of the first type, and for providing accesses to the resources in response to implementing instructions of user-requested transactions, a method comprising the steps of:

A) providing a lock manager characterized by a predetermined compatibility matrix that indicates, for a plurality of composite lock modes, which pairs of the composite lock modes are compatible with each other, the lock manager maintaining a lock table that identifies locked database resources and the composite lock modes in which they are locked, receiving lock requests that designate resources and composite lock modes in which those resources are to be locked, and responding to the lock requests by generating compatibility indications that indicate whether the lock modes designated by the lock requests are compatible in accordance with the compatibility matrix with the lock modes of locks acquired by other transactions on the database resources that the lock requests designate; and B) executing a plurality of transaction routines for performing respective transactions, each transaction routine comprising instructions that implement database-access operations, associated with respective database accesses, that apply lock requests to the lock manager and perform the associated database accesses only if the compatibility indications generated by the lock manager in response to the lock requests are positive, the resource identifiers in the lock requests being so mapped from the resources of the first and second types that each resource of the second type is mapped to a resource identifier the same as that to which the resource of the first type associated therewith is mapped, the database-access operations implemented by the instructions of the plurality of transaction routines including a set of operations that includes a plurality of operations of which each requires locks both on at least one resource of the first type and on the resource of the second type with which it is associated, the lock requests applied to the lock manager by the instructions that implement such a transaction's operations requesting, in the absence of an already existing lock acquired by the given transaction, a composite lock whose mode is associated with constituent first-resource-type and second-resource-type lock modes whose compatibility sets within a set of constituent lock modes would be sufficient to maintain serializability if the constituent first-resource-type and second-resource-type lock modes individually locked the resources of the first and second resource types, respectively, on which that operation requires locks, a given composite lock mode being compatible with another composite lock mode if and only if the constituent first-resource-type and second-resource-type lock modes associated with the given composite lock mode are respectively compatible with the first-resource-type and second-resource-type lock modes associated with that other composite lock mode.

2. A method as defined in claim 1 wherein the resources of the first type are existing key values contained in respective accessible records and belonging to an ordered sequence of possible key values and the resources of the second type are key-value ranges, each of a plurality of which extends from the existing key value associated therewith to an existing key value in front of the associated key value.

3. In a method for managing a database of accessible records that contain respective existing key values belonging to an ordered sequence of possible key values divided into key-value ranges, each of a plurality of which extends from an existing key value uniquely associated therewith to an existing key value in front of the associated key value, and for providing accesses to the records in response to implementing instructions of user-requested transactions, which method comprises the steps of:

A) providing a lock manager characterized by a compatibility matrix that indicates, for a plurality of lock modes, which pairs of the lock modes are compatible with each other, the lock manager maintaining a lock table that identifies locked database resources and the modes in which they are locked, receiving lock requests that designate resource and lock modes in which those resources are to be locked, and responding to the lock requests by generating compatibility indications that indicate whether the lock modes designated by the lock requests are compatible, in accordance with the compatibility matrix, with the lock modes of locks acquired by other transactions on the database resources that the lock requests designate; and B) executing a plurality of transaction routines for performing respective transactions, each transaction routine comprising instructions that implement database-access operations, associated with respective database accesses, that apply lock requests to the lock manager and perform the associated database accesses only if the compatibility indication generated by the lock manager in response to the lock requests is positive, the improvement wherein the compatibility matrix includes at least eight distinct lock modes.

4. For managing a database of accessible records that contain respective existing key values belonging to an ordered sequence of possible key values divided into key-value ranges, each of a plurality of which extends from an existing key value uniquely associated therewith to an existing key value in front of the associated key value, and for providing accesses to the records in response to implementing instructions of user-requested transactions, a method comprising the steps of:

A) providing a lock manager characterized by a predetermined compatibility matrix that indicates, for a plurality of lock modes, which pairs of the lock modes are compatible with each other, the compatibility matrix including delete-next range, insert-next-range, scan, and updated modes and indicating that the delete-next-range mode is incompatible with the insert-next range mode and the scan mode but compatible with the update mode which the compatibility matrix indicates to be incompatible with the scan mode, the lock manager maintaining a lock table that identifies locked database resources and the modes in which they are locked, receiving lock requests that designate resources and lock modes in which those resources are to be locked, and responding to the lock requests by generating compatibility indications that indicate whether the lock modes designated by the lock requests are compatible in accordance with the compatibility matrix with the lock modes of locks acquired by other transactions on the database resources that the lock requests designate; and B) executing a plurality of transaction routines for performing respective transactions, each transaction routine comprising instructions that implement database-access operations, associated with respective database accesses, that apply lock requests to the lock manager and perform the associated database accesses only if the compatibility indications generated by the lock manager in response to the lock requests are positive, the resource-identifiers in the lock requests being so mapped from the key values and ranges that the resource identifier to which each range is mapped is the same as that to which the key value associated therewith is mapped, the database-access operations implemented by the instructions of the plurality of transaction routines including at least:

i) a scan operation that scans through key-value ranges, lock requests applied to the lock manager by the instructions that implement a given transaction's scan operations requesting, in the absence of an already existing lock acquired by the given transaction, locks of the scan mode and including resource identifiers that represent the key-value ranges through which the scan operation scans;

ii) a delete operation that deletes a record, one said lock request applied to the lock manager by the instructions that implement the delete operation in a given transaction requesting, in the absence of an already existing lock acquired by the given transaction, a lock of the delete-next-range mode and including a resource identifier that represents the key-value range immediately behind the range with which the key value of the record to be deleted is associated;

iii) an insert operation that inserts a record, one said lock request applied to the lock manager by the instructions that implement the insert operation in a given transaction requesting, in the absence of an already-existing lock acquired by the given transaction, a lock of the insert-next-range mode and including a resource identifier that, before insertion of the record to be inserted, represents the key-value range that encompasses the key value thereof; and iv) an update operation that updates a record, one said lock request applied to the lock manager by the instructions that implement the update operation in a given transaction requesting, in the absence of an already-existing lock acquired by the given transaction, a lock of the update mode and including a resource identifier that represents the key-value range into which the key value of the record to be updated falls, whereby one transaction's scan of, or insertion of a record into, a key range from which a record has been deleted by another uncommitted transaction can be prevented without preventing the one transaction from updating the record whose key value is associated with that key range.

5. A method as defined in claim 4 wherein:

A) the compatibility matrix includes a singleton-read mode and an update-scan mode;

B) the database-access operations implemented by the instructions of the plurality of transaction routines additionally include:

i) a singleton-read operation that reads a single record, one said lock request applied to the lock manager by the instructions that implement the singleton-read operation in a given transaction requesting, in the absence of an already-existing lock acquired by the given transaction, a lock of the singleton-read mode and including a resource identifier that represents the key value of the record to be read; and ii) an update-scan operation that scans through key-value ranges and updates records having key values in those ranges, lock requests applied to the lock manager by the instructions that implement the update-scan operations requesting, in the absence of an already existing lock acquired by the same transaction, locks of the update-scan mode and including resource identifiers that represent the key-value ranges through which the update-scan operation scans;

C) the compatibility matrix includes at least five distinct lock modes IU, IIn, ID, S and SIX, whose compatibility combinations are as follows:

|     | IU | IIn | ID | S | SIX |
|-----|----|----|----|---|-----|
| IU  | X  | X  | X  |   |     |
| IIn | X  | X  |    |   |     |
| ID  | X  |    |    |   |     |
| S   |    |    |    |   | X   |
| SIX |    |    |    |   |     |

D) the scan and singleton-read modes are both S, and the update, insert-next-range, delete-next-range, and update scan modes are IU, IIn, ID, and SIX, respectively;

E) the instructions that implement the update and update-scan operations apply to the lock manager lock requests that request locks whose modes are incompatible with mode S and include resource identifiers that represent the key values of the records to be updated by those operations; and F) the instructions that implement the insert and delete operations apply to the lock manager lock requests that request locks of a mode that is incompatible with mode S and include resource identifiers that represent the key values of the records to be inserted and deleted, respectively, by those operations.

6. A method as defined in claim 5 wherein lock requests applied to the lock manager by the instructions that implement a given transaction's insert and delete operations request, in the absence of a lock previously acquired by the given transaction, locks of the IIn and ID modes, respectively, and include resource identifiers that represent the key-value ranges associated with the key values of the records respectively to be inserted and deleted.

7. A method as defined in claim 4 wherein

A) the compatibility matrix includes a singleton-read mode and an update-scan mode;

B) the database-access operations implemented by the instructions of the plurality of transaction routines additionally include:

i) a singleton-read operation that reads a single record, one said lock request applied to the lock manager by the instructions that implement the singleton-read operation in a given transaction requesting, in the absence of an already-existing lock acquired by the given transaction, a lock of the singleton-read mode and including a resource identifier that represents the key value of the record to be read; and ii) an update-scan operation that scans through key value ranges and updates records having key values in those ranges, lock requests applied to the lock manager by the instructions that implement a given transaction's update-scan operations requesting, in the absence of an already existing lock acquired by the given transaction, locks of the update-scan mode and including resource identifiers that represent the key-value ranges through which the update-scan operations scan;

C) the compatibility matrix includes at least seven distinct lock modes IS-S, IU-X, IIn-, IIn-X, ID, ID-S, ID-X, and S-, whose compatibility combinations are as follows:

| MODES | IS-S | IU-X | IIn- | IIn-X | ID- | S- | ID-X |
|-------|------|------|------|-------|-----|----|----|
| IS-S  | X    |      | X    |       | X   | X  |    |
| IU-X  |      |      | X    |       | X   |    |    |
| IIn-  | X    | X    | X    | X     |     |    |    |
| IIn-X |      |      | X    |       |     |    |    |
| ID-   | X    | X    |      |       |     |    |    |
| S-    | X    |      |      |       |     | X  |    |
| ID-X  |      |      |      |       |     |    |    |

D) the singleton-read, update, scan, update-scan, insert-next range, and delete-next-range modes are IS-S, IU-X, S-, ID-X, IIn-, and ID-, respectively; and E) the instructions that implement the insert and delete operations in a transaction apply to the lock manager lock requests that, in the absence of a previous lock acquired by that transaction, respectively request locks of modes IIn-X and ID-X and include resource identifiers that represent the key values of the records to be inserted and deleted, respectively, by those operations.

8. For managing a database of accessible records that contain respective existing key values belonging to an ordered sequence of possible key values divided into key-value ranges, each of a plurality of which extends from an existing key value uniquely associated therewith to the existing key value in front of the associated key value, and for providing accesses to the records in response to implementing instructions of user-requested transactions, a method comprising the steps of:

A) providing a lock manager characterized by a predetermined compatibility matrix that indicates, for a plurality of lock modes, which pairs of the lock modes are compatible with each other, the compatibility matrix:including delete-next-range, singleton-read, and scan modes and indicating that the delete-next-range mode is incompatible with the scan mode but compatible with the singleton-read mode, the lock manager maintaining a lock table that identifies locked database resources and the modes in which they are locked, receiving lock requests that designate resources and lock modes in which those resources are to be locked, and responding to the lock requests by generating compatibility indications that indicate whether the lock modes designated by the lock requests are compatible, in accordance with the compatibility matrix, with the lock modes of locks acquired by other transactions on the database resources that the lock requests designate; and B) executing a plurality of transaction routines for performing respective transactions, each transaction routine comprising instructions that implement database-access operations, associated with respective database accesses, that apply lock requests to the lock manager and perform the associated database accesses only if the compatibility indications generated by the lock manager in response to the lock requests are positive, the resource identifiers in the lock requests being so mapped from the key values and ranges that the resource identifier to which each range is mapped is the same as that to which the key value associated therewith is mapped, the database-access operations implemented by the instructions of the plurality of transaction routines including at least:

i) a scan operation that scans through key-value ranges, lock requests applied to the lock manager by the instructions that implement a given transaction's scan-read operations requesting, in the absence of an already existing lock acquired by the given transaction, locks of the scan mode and including resource identifiers that represent the key-value ranges through which the scan operations scan;

ii) a delete operation that deletes a record, one said lock request applied to the lock manager by the instructions that implement the delete operation in a given transaction requesting, in the absence of a previous existing lock acquired by the given transaction, a lock of the delete-next-range mode and including a resource identifier that represents the key-value range immediately behind the range with which the key value of the record to be deleted is associated;

iii) a singleton-read operation that reads a single record, one said lock request applied to the lock manager by the instructions that implement the singleton-read operation in a given transaction requesting, in the absence of an already-existing lock acquired by the given transaction, a lock of the singleton-read mode and including a resource identifier that represents the key value of the record to be read, whereby a scan by one transaction of a key range from which a record has been deleted by another, uncommitted transaction can be prevented without preventing the one transaction from reading the record whose key value is associated with that key range, and whereby deletion by one transaction of a record whose key value is immediately in front of that of an existing key value of a record read by another uncommitted transaction can be permitted without permitting deletion by the one transaction of a record whose key is in a range that has been scanned by another uncommitted transaction.

9. For managing a database of accessible records that contain respective existing key values belonging to an ordered sequence of possible key values divided into key-value ranges, each of a plurality of which extends from an existing key value uniquely associated therewith to the existing key value immediately in front of the associated key value, and for providing accesses to the records in response to implementing instructions of user-requested transactions, a method comprising the steps of:

A) providing a lock manager characterized by a predetermined compatibility matrix that indicates, for a plurality of lock modes, which pairs of the lock modes are compatible with each other, the compatibility matrix including scan, singleton-read, and insert-next-range modes and indicating that the insert-next-range mode is compatible with the singleton-read mode but is incompatible with the scan mode, the lock manager maintaining a lock table that identifies locked database resources and the modes in which they are locked, receiving lock requests that designate resources and lock modes in which those resources are to be locked, and responding to the lock requests by generating compatibility indications that indicate whether the lock modes designated by the lock requests are compatible, in accordance with the compatibility matrix, with the lock modes of locks acquired by other transactions on the database resources that the lock requests designate; and B) executing a plurality of transaction routines for performing respective transactions, each transaction routine comprising instructions that implement database-access operations, associated with respective database accesses, that apply lock requests to the lock manager and perform the associated database accesses only if the compatibility indications generated by the lock manager in response to the lock requests are positive, the resource identifiers in the lock requests being so mapped from the key values and ranges that the resource identifier to which each range is mapped is the same as that to which the key value associated therewith is mapped, the database-access operations implemented by the instructions of the plurality of transaction routines including at least:

i) a scan operation that scans through key-value ranges, lock requests applied to the lock manager by the instructions that implement a given transaction's scan operations requesting, in the absence of an already existing lock acquired by the given transaction, locks of the scan mode and including resource identifiers that represent the key-value ranges through which the scan operations scan;

ii) an insert operation that inserts a record, one said lock request applied to the lock manager by the instructions that implement the insert operation in a given transaction requesting, in the absence of an already-existing lock acquired by the same transaction, a lock of the insert-next-range mode and including a resource identifier that represents the key-value range that, before insertion of the record to be inserted, encompasses the key value thereof; and iii) a singleton-read operation that reads a single record, one said lock request applied to the lock manager by the instructions that implement the singleton-read operation in a given transaction requesting, in the absence of an already-existing lock acquired by the same transaction, a lock of the singleton-read mode and including a resource identifier that represents the key value of the record to be read, whereby insertion by one transaction of a record into a key range that has been deleted by another, uncommitted transaction can be prevented without preventing the one transaction from inserting a record into a key range associated with a key value contained in a record accessed in a singleton-read operation by another uncommitted transaction.

10. For managing a database of accessible records that contain respective existing key values belonging to an ordered sequence of possible key values divided into key-value ranges, each of a plurality of which extends from an existing key value uniquely associated therewith to the existing key value immediately in front of the associated key value, and for providing accesses to the records in response to implementing instructions of user-requested transactions, a method comprising the steps of:

A) providing a lock manager characterized by a predetermined compatibility matrix that indicates, for a plurality of lock modes, which pairs of the lock modes are compatible with each other, the compatibility matrix including a singleton update mode, an update-scan mode, and an insert-next-range mode and indicating that the insert-next-range mode is incompatible with the update-scan mode but compatible with the singleton-update mode, the lock manager maintaining a lock table that identifies locked database resources and the modes in which they are locked, receiving lock requests that designate resources and lock modes in which those resources are to be locked, and responding to the lock requests by generating compatibility indications that indicate whether the lock modes designated by the lock requests are compatible, in accordance with the compatibility matrix, with the lock modes of locks acquired by other transactions on the database resources that the lock requests designate; and B) executing a plurality of transaction routines for performing respective transactions, each transaction routine comprising instructions that implement database-access operations, associated with respective database accesses, that apply lock requests to the lock manager and perform the associated database accesses only if the compatibility indications generated by the lock manager in response to the lock requests are positive, the resource identifiers in the lock requests being so mapped from the key values and ranges that the resource identifier to which each range is mapped is the same as that to which the key value associated therewith is mapped, the database-access operations implemented by the instructions of the plurality of transaction routines including at least:

i) an update-scan operation that scans through key value ranges and updates records having key values in those ranges, lock requests applied to the lock manager by the instructions that implement the update-scan operations requesting, in the absence of an already existing lock acquired by the same transaction, locks of update-scan mode and including resource identifiers that represent the key-value ranges through which the update-scan operation scans;

ii) an insert operation that inserts a record, one said lock request applied to the lock manager by the instructions that implement the update operation in a given transaction requesting, in the absence of an already-existing lock acquired by the same transaction, a lock of the insert-next-range mode and including a resource identifier that represents the key-value range that, before insertion of the record to be inserted, encompasses the key value thereof; and iii) an update operation that updates a record, one said lock request applied to the lock manager by the instructions that implement the update operation in a given transaction requesting, in the absence of an already-existing lock acquired by the same transaction, a lock of the update-next-range mode and including a resource identifier that represents the key-value range into which the key value of the record to be updated falls, whereby an insert by one transaction of a record into a range associated with the key value of a record updated by another uncommitted transaction can be permitted while insertion into a range in which another uncommitted transaction has performed an update scan is prevented.

11. For managing a database of accessible records that contain respective existing key values belonging to an ordered sequence of possible key values divided into key-value ranges, each of a plurality of which extends from an existing key value uniquely associated therewith to an existing key value in front of the associated key value, and for providing accesses to the records in response to implementing instructions of user-requested transactions, a resource manager method comprising:

A) providing a lock manager characterized by a predetermined compatibility matrix that indicates, for a plurality of lock modes, which pairs of the lock modes are compatible with each other, the compatibility matrix including delete-next-range, insert-next-range, scan, and updated modes and indicating that the delete-next-range mode is incompatible with the insert-next range mode and the scan mode but compatible with the update mode which the compatibility matrix indicates to be incompatible with the scan mode, the lock manager maintaining a lock table that identifies locked database resources and the modes in which they are locked, receiving lock requests that designate resources and lock modes in which those resources are to be locked, and responding to the lock requests by generating compatibility indications that indicate whether the lock modes designated by the lock requests are compatible in accordance with the compatibility matrix with the lock modes of locks acquired by other transactions on the database resources that the lock requests designate; and B) providing a plurality of transaction routines for performing respective transactions, each transaction routine comprising instructions that implement database-access operations, associated with respective database accesses, that apply lock requests to the lock manager and perform the associated database accesses only if the compatibility indications generated by the lock manager in response to the lock requests are positive, the resource identifiers in the lock requests being so mapped from the key values and ranges that the resource identifier to which each range is mapped is the same as that to which the key value associated therewith is mapped, the database-access operations implemented by the instructions of the plurality of transaction routines including at least:

i) a scan operation that scans through key-value ranges, lock requests applied to the lock manager by the instructions that implement a given transaction's scan operations requesting, in the absence of an already existing lock acquired by the given transaction, locks of the scan mode and including resource identifiers that represent the key-value ranges through which the scan operation scans;

ii) a delete operation that deletes a record, one said lock request applied to the lock manager by the instructions that implement the delete operation in a given transaction requesting, in the absence of an already existing lock acquired by the given transaction, a lock of the delete-next-range mode and including a resource identifier that represents the key-value range immediately behind the range with which the key value of the record to be deleted is associated;

iii) an insert operation that inserts a record, one said lock request applied to the lock manager by the instructions that implement the insert operation in a given transaction requesting, in the absence of an already-existing lock acquired by the given transaction, a lock of the insert-next-range mode and including a resource identifier that, before insertion of the record to be inserted, represents the key-value range that encompasses the key value thereof; and iv) an update operation that updates a record, one said lock request applied to the lock manager by the instructions that implement the update operation in a given transaction requesting, in the absence of an already-existing lock acquired by the given transaction, a lock of the update mode and including a resource identifier that represents the key-value range into which the key value of the record to be updated falls, whereby one transaction's scan of, or insertion of a record into, a key range from which a record has been deleted by another uncommitted transaction can be prevented without preventing the one transaction from updating the record whose key value is associated with that key range.

12. The resource manager method according to claim 11 wherein:
   A) the compatibility matrix includes a singleton-read mode and an update-scan mode;
   B) the database-access operations implemented by the instructions of the plurality of transaction routines additionally include:
      i) a singleton-read operation that reads a single record, one said lock request applied to the lock manager by the instructions that implement the singleton-read operation in a given transaction requesting, in the absence of an already-existing lock acquired by the given transaction, a lock of the singleton-read mode and including a resource identifier that represents the key value of the record to be read; and
      ii) an update-scan operation that scans through key-value ranges and updates records having key values in those ranges, lock requests applied to the lock manager by the instructions that implement date-scan operations requesting, in the absence of an already existing lock acquired by the same transaction, locks of the update-scan mode and including resource identifiers that represent the key-value ranges through which the update-scan operation scans;
   C) the compatibility matrix includes at least five distinct lock modes IU, IIn, ID, S and SIX, whose compatibility combinations are as follows:

|     | IU | IIn | ID | S | SIX |
|-----|----|----|----|---|-----|
| IU  | X  | X  | X  |   |     |
| IIn | X  | X  |    |   |     |
| ID  | X  |    |    |   |     |
| S   |    |    |    |   | X   |
| SIX |    |    |    |   |     |

D) the scan and singleton-read modes are both S, and the update, inset-next-range, delete-next-range, and update-scan modes are IU, IIn, ID, and SIX, respectively;
   E) the instructions that implement the update and update-scan operations apply to the lock manager lock requests that request locks whose modes are incompatible with mode S and include resource identifiers that represent the key values of the records to be updated by those operations; and
   F) the instructions that implement the insert and delete operations apply to the lock manager lock requests that request locks of a mode that is incompatible with mode S and include resource identifiers that represent the key values of the records to be inserted and deleted, respectively, by those operations.

13. The resource manager method according to claim 12 wherein lock requests applied to the lock manager by the instructions that implement a given transaction's insert and delete operations request, in the absence of a lock previously acquired by the given transaction, locks of the IIn and ID modes, respectively, and include resource identifiers that represent the key-value ranges associated with the key values of the records respectively to be inserted and deleted.

14. The resource manager method according to claim 11 wherein

A) the compatibility matrix includes a singleton-read mode and an update-scan mode;
B) the database-access operations implemented by the instructions of the plurality of transaction routines additionally include:
   i) a singleton-read operation that reads a single record, one said lock request applied to the lock manager by the instructions that implement the singleton-read operation in a given transaction requesting, in the absence of an already-existing lock acquired by the given transaction, a lock of the singleton-read mode and including a resource identifier that represents the key value of the record to be read; and
   ii) an update-scan operation that scans through key-value ranges and updates records having key values in those ranges, lock requests applied to the lock manager by the instructions that implement a given transaction's update-scan operations requesting, in the absence of an already existing lock acquired by the given transaction, locks of the update-scan mode and including resource identifiers that represent the key-value ranges through which the update-scan operations scan;
C) the compatibility matrix includes at least seven distinct lock modes IS-S, IU-X, IIn-, IIn-X, ID, ID-S, ID-X, and S-, whose compatibility combinations are as follows:

| MODES | IS-S | IU-X | IIn- | IIn-X | ID- | S- | ID-X |
|-------|------|------|------|-------|-----|----|----|
| IS-S  | X    |      | X    |       | X   | X  |    |
| IU-X  |      |      | X    |       |     | X  |    |
| IIn-  | X    | X    | X    | X     |     |    |    |
| IIn-X |      |      | X    |       |     |    |    |
| ID-   | X    | X    |      |       |     |    |    |
| S-    | X    |      |      |       |     |    | X  |
| ID-X  |      |      |      |       |     |    |    |

D) the singleton-read, update, scan, update-scan, insert-next- range, and delete-next-range modes are IS-S, IU-X, S-, ID-X, IIn-, and ID-, respectively; and
E) the instructions that implement the insert and delete operations in a transaction apply to the lock manager lock requests that, in the absence of a previous lock acquired by that transaction, respectively request locks of modes IIn-X and ID-X and include resource identifiers that represent the key values of the records to be inserted and deleted, respectively, by those operations.

15. A database-management system for managing a database of accessible records that contain resources of first and second resource types, each of a plurality of the resources of the second type being uniquely associated with a respective resource of the first type, and for providing accesses to the resources in response to implementing instructions of user-requested transactions, the database-management system comprising:
   A) a lock manager characterized by a predetermined compatibility matrix that indicates, for a plurality of composite lock modes, which pairs of the composite lock modes are compatible with each other, the lock manager maintaining a lock table that identifies locked database resources and the composite lock modes in which they are locked, receiving lock requests that designate resources and composite lock modes in which those resources are to be locked, and responding to the lock requests by generating compatibility indications that indicate whether the lock modes designated by the lock requests are compatible in accordance with the compatibility matrix with the lock modes of locks acquired by other transactions on the database resources that the lock requests designate; and B) a query compiler for receiving a transaction definition from a database definer and compiling the transaction definition into a transaction routine for performing a transaction, the transaction routine comprising instructions that implement database-access operations, associated with respective database accesses, that apply lock requests to the lock manager and perform the associated database accesses only if the compatibility indications generated by the lock manager in response to the lock requests are positive, the resource identifiers in the lock requests being so mapped from the resources of the first and second resource types that each resource of the second type is mapped to a resource identifier the same as that to which the resource of the first type associated therewith is mapped, the query compiler selecting the database-access operations in accordance with the transaction definitions from among a set of operations that includes a plurality of operations of which each acquires locks both on the at least one resource of the first type and on the resource of the second type with which it is associated, the lock requests applied to the lock manager by the instructions that implement such a transaction's operations requesting, in the absence of an already existing lock acquired by the given transaction, a composite lock whose mode is associated with constituent first-resource-type and second-resource-type lock modes whose compatibility sets within a set of constituent lock modes would be sufficient to maintain serializability if the constituent first-resource-type and second-resource-type lock modes individually locked the resources of the first and second resource types, respectively, on which that operation requires locks, a given composite lock mode being compatible with another composite lock mode if and only if the constituent first-resource-type and second-resource-type lock associated with the given composite lock mode are respectively compatible with the first-resource-type and second-resource-type lock modes associated with that other composite lock mode.

16. A database-management system as defined in claim 15 wherein the resources of the first type are existing key values contained in respective accessible records and belonging to an ordered sequence of possible key values and the resources of the second type are key-value ranges, each of a plurality of which extends from the existing key value associated therewith to an existing key value in front of the associated key value.

17. In a database-management system for managing a database of accessible records that contain respective existing key values belonging to an ordered sequence of possible key values divided into key-value ranges, each of a plurality of which extends from an existing key value uniquely associated therewith to an existing key value in front of the associated key value, and for providing accesses to the records in response to implementing instructions of user-requested transactions, the database-management system comprising:

A) a lock manager characterized by a compatibility matrix that indicates, for a plurality of lock modes, which pairs of the lock modes are compatible with each other, the lock manager maintaining a lock table that identifies locked database resources and the modes in which they are locked, receiving lock requests that designate resources and lock modes in which those resources are to be locked, and responding to the lock requests by generating compatibility indications that indicate whether the lock modes designated by the lock requests are compatible, in accordance with the compatibility matrix, with the lock modes of locks acquired by other transactions on the database resources that the lock requests designate; and B) a query compiler for receiving a transaction definition from a database definer and compiling the transaction definition into a transaction routine for performing a transaction, the transaction routine comprising instructions that implement database-access operations, associated with respective database accesses, that apply lock requests to the lock manager and perform the associated database accesses only if the compatibility indication generated by the lock manager in response to the lock requests is positive, the improvement wherein the compatibility matrix includes at least eight distinct lock modes.

18. A database-management system for managing a database of accessible records that contain respective existing key values belonging to an ordered sequence of possible key values divided into key-value ranges, each of a plurality of which extends from an existing key value uniquely associated therewith to an existing key value in front of the associated key value, and for providing accesses to the records in response to implementing instructions of user-requested transactions, the database-management system comprising:

A) a lock manager characterized by a predetermined compatibility matrix that indicates, for a plurality of lock modes, which pairs of the lock modes are compatible with each other, the compatibility matrix including delete-next-range, insert-next-range, scan, and update modes and indicating that the delete-next-range mode is incompatible with the insert-next range mode and the scan mode but compatible with the update mode, which the compatibility matrix indicates to be incompatible with the scan mode, the lock manager maintaining a lock table that identifies locked database resources and the modes in which they are locked, receiving lock requests that designate resources and lock modes in which those resources are to be locked, and responding to the lock requests by generating compatibility indications that indicate whether the lock modes designated by the lock requests are compatible in accordance with the compatibility matrix with the lock modes of locks acquired by other transactions on the database resources that the lock requests designate; and B) a query compiler for receiving a transaction definition from a database definer and compiling the transaction definition into a transaction routine for performing a transaction, the transaction routine comprising instructions that implement database-access operations, associated with respective database accesses, that apply lock requests to the lock manager and perform the associated database accesses only if the compatibility indications generated by the lock manager in response to the lock requests are positive, the resource identifiers in the lock requests being so mapped from the key values and ranges that the resource identifier to which each range is mapped is the same as that to which the key value associated therewith is mapped, the query compiler selecting the database-access operations in accordance with the transaction definitions from among at least:
  i) a scan operation that scans through key-value ranges, lock requests applied to the lock manager by the instructions that implement a given transaction's scan operations requesting, in the absence of an already existing lock acquired by the given transaction, locks of the scan mode and including resource identifiers that represent the key-value ranges through which the scan operation scans;
  ii) a delete operation that deletes a record, one said lock request applied to the lock manager by the instructions that implement the delete operation in a given transaction requesting, in the absence of an already existing lock acquired by the given transaction, a lock of the delete-next-range mode and including a resource identifier that represents the key-value range immediately behind the range with which the key value of the record to be deleted is associated;
  iii) an insert operation that inserts a record, one said lock request applied to the lock manager by the instructions that implement the insert operation in a given transaction requesting, in the absence of an already-existing lock acquired by the given transaction, a lock of the insert-next-range mode and including a resource identifier that, before insertion of the record to be inserted, represents the key-value range that encompasses the key value thereof; and
  iv) an update operation that updates a record, one said lock request applied to the lock manager by the instructions that implement the update operation in a given transaction requesting, in the absence of an already-existing lock acquired by the given transaction, a lock of the update mode and including a resource identifier that represents the key-value range into which the key value of the record to be updated falls,
whereby one transaction's scan of, or insertion of a record into, a key range from which a record has been deleted by another uncommitted transaction can be prevented without preventing the one transaction from updating the record whose key value is associated with that key range.

19. A database-management system as defined in claim 18 wherein:
  A) the compatibility matrix includes a singleton-read mode and an update-scan mode;
  B) the database-access operations from which the query compiler selects in accordance with the transaction definitions additionally include:
    i) a singleton-read operation that reads a single record, one said lock request applied to the lock manager by the instructions that implement the singleton-read operation in a given transaction requesting, in the absence of an already-existing lock acquired by the given transaction, a lock of the singleton-read mode and including a resource identifier that represents the key value of the record to be read; and
    ii) an update-scan operation that scans through key-value ranges and updates records having key values in those ranges, lock requests applied to the lock manager by the instructions that implement the update-scan operations requesting, in the absence of an already existing lock acquired by the same transaction, locks of the update-scan mode and including resource identifiers that represent the key-value ranges through which the update-scan operation scans;
  C) the compatibility matrix includes at least five distinct lock modes IU, IIn, ID, S, and SIX, whose compatibility combinations are as follows:

|     | IU | IIn | ID | S | SIX |
|-----|----|----|----|---|-----|
| IU  | X  | X  | X  |   |     |
| IIn | X  | X  |    |   |     |
| ID  | X  |    |    |   |     |
| S   |    |    |    |   | X   |
| SIX |    |    |    |   |     |

D) the scan and singleton-read modes are both S, and the update, insert-next-range; delete-next-range, and update scan modes are IU, IIn, ID, and SIX, respectively;
  E) the instructions that implement the update and update-scan operations apply to the lock manager lock requests that request locks whose modes are incompatible with mode S and include resource identifiers that represent the key values of the records to be updated by those operations; and the instructions that implement the insert and delete operations apply to the lock manager lock requests that request locks of a mode that is incompatible with mode S and include resource identifiers that represent the key values of the records to be inserted and deleted, respectively, by those operations.

20. A database-management system as defined in claim 10 wherein lock requests applied to the lock manager by the instructions that implement a given transaction's insert and delete operations request, in the absence of a lock previously acquired by the given transaction, locks of the IIn and ID modes, respectively, and include resource identifiers that represent the key-value ranges associated with the key values of the records respectively to be inserted and deleted.

21. A database-management system as defined in claim 18 wherein
  A) the compatibility matrix includes a singleton-read mode and an update-scan mode;
  B) the database-access operations from which the query compiler selects in accordance with the transaction definitions additionally include:
    i) a singleton-read operation that reads a single record, one said lock request applied to the lock manager by the instructions that implement the singleton-read operation in a given transaction requesting, in the absence of an already-existing lock acquired by the given transaction, a lock of the singleton-read mode and including a resource identifier that represents the key value of the record to be read; and
    ii) an update-scan operation that scans through key-value ranges and updates records having key values in those ranges, lock requests applied to the lock manager by the instructions that implement a given transaction's update-scan operations requesting, in the absence of an already existing lock acquired by the given transaction, locks of the update-scan mode and including resource identifiers that represent the key-value ranges through which the update-scan operations scan;
  C) the compatibility matrix includes at least seven distinct lock modes IS-S, IU-X, IIn-, IIn-X, ID-, ID-X, and S-, whose compatibility combinations are as follows:

| MODES | IS-S | IU-X | IIn- | IIn-X | ID- | S- | ID-X |
|-------|------|------|------|-------|-----|-----|------|
| IS-S  | X    |      | X    |       | X   | X   |      |
| IU-X  |      |      | X    |       | X   |     |      |
| IIn-  | X    | X    | X    | X     |     |     |      |
| IIn-X |      |      | X    |       |     |     |      |
| ID-   | X    | X    |      |       |     |     |      |
| S-    | X    |      |      |       |     |     | X    |
| ID-X  |      |      |      |       |     |     |      |

D) the singleton-read, update, scan, update-scan, insert-next range, and delete-next-range modes are IS-S, IU-X, S-, ID-X, IIn-, and ID-, respectively; and E) the instructions that implement the insert and delete operations in a transaction apply to the lock manager lock requests that, in the absence of a previous lock acquired by that transaction, respectively request locks of modes IIn-X and ID-X and include resource identifiers that represent the key values of the records to be inserted and deleted, respectively, by those operations.

22. A database-management system for managing a database of accessible records that contain respective existing key values belonging to an ordered sequence of possible key values divided into key-value ranges, each of a plurality of which extends from an existing key value uniquely associated therewith to the existing key value in front of the associated key value, and for providing accesses to the records in response to implementing instructions of user-requested transactions, the database-management system comprising:

A) a lock manager characterized by a predetermined compatibility matrix that indicates, for a plurality of lock modes, which pairs of the lock modes are compatible with each other, the compatibility matrix including delete-next-range, singleton-read, and scan modes and indicating that the delete-next-range mode is incompatible with the scan mode but compatible with the singleton-read mode, the lock manager maintaining a lock table that identifies locked database resources and the modes in which they are locked, receiving lock requests that designate resources and lock modes in which those resources are to be locked, and responding to the lock requests by generating compatibility indications that indicate whether the lock modes designated by the lock requests are compatible, in accordance with the compatibility matrix, with the lock modes of locks acquired by other transactions on the database resources that the lock requests designate; and B) a query compiler for receiving a transaction definition from a database definer and compiling the transaction definition into a transaction routine for performing a transaction, the transaction routine comprising instructions that implement database-access operations, associated with respective database accesses, that apply lock requests to the lock manager and perform the associated database accesses only if the compatibility indications generated by the lock manager in response to the lock requests are positive, the resource identifiers in the lock requests being so mapped from the key values and ranges that the resource identifier to which each range is mapped is the same as that to which the key value associated therewith is mapped, the query compiler selecting the database-access operations in accordance with the transaction definitions from among at least:

i) a scan operation that scans through key-value ranges, lock requests applied to the lock manager by the instructions that implement a given transaction's scan-read operations requesting, in the absence of an already existing lock acquired by the given transaction, locks of the scan mode and including resource identifiers that represent the key-value ranges through which the scan operations scan;

ii) a delete operation that deletes a record, one said lock request applied to the lock manager by the instructions that implement the delete operation in a given transaction requesting, in the absence of a previous existing lock acquired by the given transaction, a lock of the delete-next-range mode and including a resource identifier that represents the key-value range immediately behind the range with which the key value of the record to be deleted is associated;

iii) a singleton-read operation that reads a single record, one said lock request applied to the lock manager by the instructions that implement the singleton-read operation in a given transaction requesting, in the absence of an already-existing lock acquired by the given transaction, a lock of the singleton-read mode and including a resource identifier that represents the key value of the record to be read, whereby a scan by one transaction of a key range from which a record has been deleted by another, uncommitted transaction can be prevented without preventing the one transaction from reading the record whose key value is associated with that key range, and whereby deletion by one transaction of a record whose key value is immediately in front of that of an existing key value of a record read by another uncommitted transaction can be permitted without permitting deletion by the one transaction of a record whose key is in a range that has been scanned by another uncommitted transaction.

23. A database-management system for managing a database of accessible records that contain respective existing key values belonging to an ordered sequence of possible key values divided into key-value ranges, each of a plurality of which extends from an existing key value uniquely associated therewith to the existing key value immediately in front of the associated key value, and for providing accesses to the records in response to implementing instructions of user-requested transactions, the database-management system comprising:

A) a lock manager characterized by a predetermined compatibility matrix that indicates, for a plurality of lock modes, which pairs of the lock modes are compatible with each other, the compatibility matrix including scan, singleton-read, and insert-next-range modes and indicating that the insert-next-range mode is compatible with the singleton-read mode but is incompatible with the scan mode, the lock manager maintaining a lock table that identifies locked database resources and the modes in which they are locked, receiving lock requests that designate resources and lock modes in which those resources are to be locked, and responding to the lock requests by generating compatibility indications that indicate whether the lock modes designated by the lock requests are compatible, in accordance with the compatibility matrix, with the lock modes of locks acquired by other transactions on the database resources that the lock requests designate; and B) a query compiler for receiving a transaction definition from a database definer and compiling the transaction definition into a transaction routine for performing a transaction, the transaction routine comprising instructions that implement database-access operations, associated with respective dam base accesses, that apply lock requests to the lock manager and perform the associated database accesses only if the compatibility indications generated by the lock manager in response to the lock requests are positive, the resource identifiers in the lock requests being so mapped from the key values and ranges that the resource identifier to which each range is mapped is the same as that to which the key value associated therewith is mapped, the query compiler selecting the database-access operations in accordance with the transaction definitions from among at least:

i) a scan operation that scans through key-value ranges, lock requests applied to the lock manager by the instructions that implement a given transaction's scan operations requesting, in the absence of an already existing lock acquired by the given transaction, locks of the scan mode and including resource identifiers that represent the key-value ranges through which the scan operations scan;

ii) an insert operation that inserts a record, one said lock request applied to the lock manager by the instructions that implement the insert operation in a given transaction requesting, in the absence of an already-existing lock acquired by the same transaction, a lock of the insert-next-range mode and including a resource identifier that represents the key-value range that, before insertion of the record to be inserted, encompasses the key value thereof; and iii) a singleton-read operation that reads a single record, one said lock request applied to the lock manager by the instructions that implement the singleton-read operation in a given transaction requesting, in the absence of an already-existing lock acquired by the same transaction, a lock of the singleton-read mode and including a resource identifier that represents the key value of the record to be read, whereby insertion by one transaction of a record into a key range that has been deleted by another, uncommitted transaction can be prevented without preventing the one transaction from inserting a record into a key range associated with a key value contained in a record accessed in a singleton-read operation by another uncommitted transaction.

24. A database-management system for managing a database of accessible records that contain respective existing key values belonging to an ordered sequence of possible key values divided into key-value ranges, each of a plurality of which extends from an existing key value uniquely associated therewith to the existing key value immediately in front of the associated key value, and for providing accesses to the records in response to implementing instructions of user-requested transactions, the database-management system comprising:

A) a lock manager characterized by a predetermined compatibility matrix that indicates, for a plurality of lock modes, which pairs of the lock modes are compatible with each other, the compatibility matrix including a singleton-update mode, an update-scan mode, and an insert-next-range mode and indicating that the insert-next-range mode is incompatible with the update-scan mode but compatible with the singleton-update mode, the lock manager maintaining a lock table that identifies locked-database resources and the modes in which they are locked, receiving lock requests that designate resources and lock modes in which those resources are to be locked, and responding to the lock requests by generating compatibility indications that indicate whether the lock modes designated by the lock requests are compatible, in accordance with the compatibility matrix, with the lock modes of locks acquired by other transactions on the database resources that the lock requests designate; and B) a query compiler for receiving a transaction definition from a database definer and compiling the transaction definition into a transaction routine for performing a transaction, the transaction routine comprising instructions that implement database-access operations, associated with respective database accesses, that apply lock requests to the lock manager and perform the associated database accesses only if the compatibility indications generated by the lock manager in response to the lock requests are positive, the resource identifiers in the lock requests being so mapped from the key values and ranges that the resource identifier to which each range is mapped is the same as that to which the key value associated therewith is mapped, the query compiler selecting the database-access operations in accordance with the transaction definitions from among at least:

i) an update-scan operation that scans through key-value ranges and updates records having key values in those ranges, lock requests applied to the lock manager by the instructions that implement the update-scan operations requesting, in the absence of an already existing lock acquired by the same transaction, locks of update-scan mode and including resource identifiers that represent the key-value ranges through which the update-scan operation scans;

ii) an insert operation that inserts a record, one said lock request applied to the lock manager by the instructions that implement the update operation in a given transaction requesting, in the absence of an already-existing lock acquired by the same transaction, a lock of the insert-next-range mode and including a resource identifier that represents the key-value range that, before insertion of the record to be inserted, encompasses the key value thereof; and iii) an update operation that updates a record, one said lock request applied to the lock manager by the instructions that implement the update operation in a given transaction requesting, in the absence of an already-existing lock acquired by the same transaction, a lock of the update-next-range mode and including a resource identifier that represents the key-value range into which the key value of the record to be updated falls, whereby an insert by one transaction of a record into a range associated with the key value of a record updated by another uncommitted transaction can be permitted while insertion into a range in which another uncommitted transaction has performed an update scan is prevented.

25. A resource-management system for managing a database of accessible records that contain resources of first and second types, each of a plurality of the resources of the second type being uniquely associated with a respective resource of the first type, and for providing accesses to the resources in response to implementing instructions of user-requested transactions, the resource-management system comprising:

A) a lock manager characterized by a predetermined compatibility matrix that indicates, for a plurality of composite lock modes, which pairs of the composite lock modes are compatible with each other, the lock manager maintaining a lock table that identifies locked database resources and the composite lock modes in which they are locked, receiving lock requests that designate resources and composite lock modes in which those resources are to be locked, and responding to the lock requests by generating compatibility indications that indicate whether the lock modes designated by the lock requests are compatible in accordance with the compatibility matrix with the lock modes of locks acquired by other transactions on the database resources that the lock requests designate; and B) means for executing a plurality of transaction routines for performing respective transactions, each transaction routine comprising instructions that implement database-access operations, associated with respective database accesses, that apply lock requests to the lock manager and perform the associated database accesses only if the compatibility indications generated by the lock manager in response to the lock requests are positive, the resource identifiers in the lock requests being so mapped from the resources of the first and second types that each resource of the second type is mapped to a resource identifier the same as that to which the resource of the first type associated therewith is mapped, the database-access operations implemented by the instructions of the plurality of transaction routines including a set of operations that includes a plurality of operations of which each requires locks both on at least one resource of the first type and on the resource of the second type with which it is associated, the lock requests applied to the lock manager by the instructions that implement such a transaction's operations requesting, in the absence of an already existing lock acquired by the given transaction, a composite lock whose mode is associated with constituent first-resource-type and second-resource-type lock modes whose compatibility sets within a set of constituent lock modes would be sufficient to maintain serializability if the constituent first-resource-type and second-resource-type lock modes individually locked the resources of the first and second resource types, respectively, on which that operation requires locks, a given composite lock mode being compatible with another composite lock mode if and only if the constituent first-resource-type and second-resource-type lock modes associated with the given composite lock mode are respectively compatible with the first-resource-type and second-resource-type lock modes associated with that other composite lock mode.

26. A resource-management system as defined in claim 25 wherein the resources of the first type are existing key values contained in respective accessible records and belonging to an ordered sequence of possible key values and the resources of the second type are key-value ranges, each of a plurality of which extends from the existing key value associated therewith to an existing key value in front of the associated key value.

27. In a resource-management system for managing a database of accessible records that contain respective existing key values belonging to an ordered sequence of possible key values divided into key-value ranges, each of a plurality of which extends from an existing key value uniquely associated therewith to an existing key value in front of the associated key value, and for providing accesses to the records in response to implementing instructions of user-requested transactions, which resource-management system includes:

A) a lock manager characterized by a compatibility matrix that indicates, for a plurality of lock modes, which pairs of the lock modes are compatible with each other, the lock manager maintaining a lock table that identifies locked database resources and the modes in which they are locked, receiving lock requests that designate resource and lock modes in which those resources are to be locked, and responding to the lock requests by generating compatibility indications that indicate whether the lock modes designated by the lock requests are compatible, in accordance with the compatibility matrix, with the lock modes of locks acquired by other transactions on the database resources that the lock requests designate; and B) means for executing a plurality of transaction routines for performing respective transactions, each transaction routine comprising instructions that implement database-access operations, associated with respective database accesses, that apply lock requests to the lock manager and perform the associated database accesses only if the compatibility indication generated by the lock manager in response to the lock requests is positive, the improvement wherein the compatibility matrix includes at least eight distinct lock modes.

28. For managing a database of accessible records that contain respective existing key values belonging to an ordered sequence of possible key values divided into key-value ranges, each of a plurality of which extends from an existing key value uniquely associated therewith to the existing key value in front of the associated key value, and for providing accesses to the records in response to implementing instructions of user-requested transactions, a resource manager comprising:

A) a lock manager characterized by a predetermined compatibility matrix that indicates, for a plurality of lock modes, which pairs of the lock modes are compatible with each other, the compatibility matrix including delete-next-range, singleton-read, and scan modes and indicating that the delete-next-range mode is incompatible with the scan mode but compatible with the singleton-read mode, the lock manager maintaining a lock table that identifies locked database resources and the modes in which they are locked, receiving lock requests that designate resources and lock modes in which those resources are to be locked, and responding to the lock requests by generating compatibility indications that indicate whether the lock modes designated by the lock requests are compatible, in accordance with the compatibility matrix, with the lock modes of locks acquired by other transactions on the database resources that the lock requests designate; and B) means for executing a plurality of transaction routines for performing respective transactions, each transaction routine comprising instructions that implement database-access operations, associated with respective database accesses, that apply lock requests to the lock manager land perform the associated database accesses only if the compatibility indications generated by the lock manager in response to the lock requests are positive, the resource identifiers in the lock requests being so mapped from the key values and ranges that the resource identifier to which each range is mapped is the same as that to which the key value associated therewith is mapped, the database-access operations implemented by the instructions of the plurality of transaction routines including at least:

i) a scan operation that scans through key-value ranges, lock requests applied to the lock manager by the instructions that implement a given transaction's scan-read operations requesting, in the absence of an already existing lock acquired by the given transaction, locks of the scan mode and including resource identifiers that represent the key-value ranges through which the scan operations scan;

ii) a delete operation that deletes a record, one said lock request applied to the lock manager by the instructions that implement the delete operation in a given transaction requesting, in the absence of a previous existing lock acquired by the given transaction, a lock of the delete-next-range mode and including a resource identifier that represents the key-value range immediately behind the range with which the key value of the record to be deleted is associated;

iii) a singleton-read operation that reads a single record, one said lock request applied to the lock manager by the instructions that implement the singleton-read operation in a given transaction requesting, in the absence of an already-existing lock acquired by the given transaction, a lock of the singleton-read mode and including a resource identifier that represents the key value of the record to be read, whereby a scan by one transaction of a key range from which a record has been deleted by another, uncommitted transaction can be prevented without preventing the one transaction from reading the record whose key value is associated with that key range, and whereby deletion by one transaction of a record whose key value is immediately in front of that of an existing key value of a record read by another uncommitted transaction can be permitted without permitting deletion by the one transaction of a record whose key is in a range that has been scanned by another uncommitted transaction.

29. For managing a database of accessible records that contain respective existing key values belonging to an ordered sequence of possible key values divided into key-value ranges, each of a plurality of which extends from an existing key value uniquely associated therewith to the existing key value immediately in front of the associated key value, and for providing accesses to the records in response to implementing instructions of user-requested transactions, a resource manager comprising:

A) a lock manager characterized by a predetermined compatibility matrix that indicates, for a plurality of lock modes, which pairs of the lock modes are compatible with each other, the compatibility matrix including scan, singleton-read, and insert-next-range modes and indicating that the insert-next-range mode is compatible with the singleton-read mode but is incompatible with the scan mode, the lock manager maintaining a lock table that identifies locked database resources and the modes in which they are locked, receiving lock requests that designate resources and lock modes in which those resources are to be locked, and responding to the lock requests by generating compatibility indications that indicate whether the lock modes designated by the, lock requests are compatible, in accordance with the compatibility matrix, with the lock modes of locks acquired by other transactions on the database resources that the lock requests designate; and B) executing a plurality of transaction routines for performing respective transactions, each transaction routine comprising instructions that implement database-access operations, associated with respective database accesses, that apply lock requests to the lock manager and perform the associated database accesses only if the compatibility indications generated by the lock manager in response to the lock requests are positive, the resource identifiers in the lock requests being so mapped from the key values and ranges that the resource identifier to which each range is mapped is the same as that to which the key value associated therewith is mapped, the database-access operations implemented by the instructions of the plurality of transaction routines including at least:

i) a scan operation that scans through key-value ranges, lock requests applied to the lock manager by the instructions that implement a given transaction's scan operations requesting, in the absence of an already existing lock acquired by the given transaction, locks of the scan mode and including resource identifiers that represent the key-value ranges through which the scan operations scan;

ii) an insert operation that inserts a record, one said lock request applied to the lock manager by the instructions that implement the insert operation in a given transaction requesting, in the absence of an already-existing lock acquired by the same transaction, a lock of the insert-next-range mode and including a resource identifier that represents the key-value range that, before insertion of the record to be inserted, encompasses the key value thereof; and iii) a singleton-read operation that reads a single record, one said lock request applied to the lock manager by the instructions that implement the singleton-read operation in a given transaction requesting, in the absence of an already-existing lock acquired by the same transaction, a lock of the singleton-read mode and including a resource identifier that represents the key value of the record to be read, whereby insertion by one transaction of a record into a key range that has been deleted by another, uncommitted transaction can be prevented without preventing the one transaction from inserting a record into a key range associated with a key value contained in a record accessed in a singleton-read operation by another uncommitted transaction.

30. For managing a database of accessible records that contain respective existing key values belonging to an ordered sequence of possible key values divided into key-value ranges, each of a plurality of which extends from an existing key value uniquely associated therewith to the existing key value immediately in front of the associated key value, and for providing accesses to the records in response to implementing instructions of user-requested transactions, a resource manager comprising:

A) a lock manager characterized by a predetermined compatibility matrix that indicates, for a plurality of lock modes, which pairs of the lock modes are compatible with each other, the compatibility matrix including a singleton-update mode, an update-scan mode, and an insert-next-range mode and indicating that the insert-next-range mode is incompatible with the update-scan mode but compatible with the singleton-update mode, the lock manager maintaining a lock table that identifies locked database resources and the modes in which they are locked, receiving lock requests that designate resources and lock modes in which those resources are to be locked, and responding to the lock requests by generating compatibility indications that indicate whether the lock modes designated by the lock requests are compatible, in accordance with the compatibility matrix, with the lock modes of locks acquired by other transactions on the database resources that the lock requests designate; and B) means for executing a plurality of transaction routines for performing respective transactions, each transaction routine comprising instructions that implement database-access operations, associated with respective database accesses, that apply lock requests to the lock manager and perform the associated database accesses only if the compatibility indications generated by the lock manager in response to the lock requests are positive, the resource identifiers in the lock requests being so mapped from the key values and ranges that the resource identifier to which each range is mapped is the same as that to which the key value associated therewith is mapped, the database-access operations implemented by the instructions of the plurality of transaction routines including at least:

i) an update-scan operation that scans through key-value ranges and updates records having key values in those ranges, lock requests applied to the lock manager by the instructions that implement the update-scan operations requesting, in the absence of an already existing lock acquired by the same transaction, locks of update-scan mode and including resource identifiers that represent the key-value ranges through which the update-scan operation scans;

ii) an insert operation that inserts a record, one said lock request applied to the lock manager by the instructions that implement the update operation in a given transaction requesting, in the absence of an already-existing lock acquired by the same transaction, a lock of the insert-next-range mode and including a resource identifier that represents the key-value range that, before insertion of the record to be inserted, encompasses the key value thereof; and iii) an update operation that updates a record, one said lock request applied to the lock manager by the instructions that implement the update operation in a given transaction requesting, in the absence of an already-existing lock acquired by the same transaction, a lock of the update-next-range mode and including a resource identifier that represents the key-value range into which the key value of the record to be updated falls, whereby an insert by one transaction of a record into a range associated with the key value of a record updated by another uncommitted transaction can be permitted while insertion into a range in which another uncommitted transaction has performed an update scan is prevented.

* * * * *